US008213977B2

(12) United States Patent
Klein et al.

(10) Patent No.: US 8,213,977 B2
(45) Date of Patent: Jul. 3, 2012

(54) METHOD AND APPARATUS FOR PRESENTING AND CONTROLLING INFORMATION FOR MANAGING AN EVENT

(75) Inventors: Thierry E. Klein, Fanwood, NJ (US);
John F. Lertola, Lebanon, NJ (US);
Dorel Livescu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1025 days.

(21) Appl. No.: 12/054,892

(22) Filed: Mar. 25, 2008

(65) Prior Publication Data

US 2008/0311894 A1 Dec. 18, 2008

Related U.S. Application Data

(60) Provisional application No. 60/934,666, filed on Jun. 15, 2007.

(51) Int. Cl.
*G06F 15/16* (2006.01)
*H04M 3/00* (2006.01)

(52) U.S. Cl. ............... 455/519; 455/404.1; 455/416; 455/566

(58) Field of Classification Search .......... 455/518, 455/519
See application file for complete search history.

(56) References Cited

U.S. PATENT DOCUMENTS

| | | | | |
|---|---|---|---|---|
| 5,465,286 A * | 11/1995 | Clare et al. | ............ | 379/32.04 |
| 7,117,265 B2 * | 10/2006 | Hamasaki et al. | ............ | 709/227 |
| 7,587,215 B2 * | 9/2009 | Chakraborty et al. | ............ | 455/518 |
| 7,711,384 B1 * | 5/2010 | Szuszczewicz et al. | ............ | 455/519 |
| 7,792,277 B2 * | 9/2010 | Shaffer et al. | ............ | 379/266.02 |
| 7,882,448 B2 * | 2/2011 | Haug | ............ | 715/779 |
| 7,991,136 B2 * | 8/2011 | Denny et al. | ............ | 379/202.01 |
| 2002/0077158 A1 * | 6/2002 | Scott | ............ | 455/567 |
| 2003/0073406 A1 * | 4/2003 | Benjamin et al. | ............ | 455/41 |
| 2005/0192008 A1 * | 9/2005 | Desai et al. | ............ | 455/435.2 |
| 2005/0197971 A1 * | 9/2005 | Kettner et al. | ............ | 705/400 |
| 2006/0030348 A1 * | 2/2006 | Drozt et al. | ............ | 455/519 |
| 2007/0123271 A1 * | 5/2007 | Dickinson | ............ | 455/456.1 |
| 2007/0123286 A1 * | 5/2007 | Mock et al. | ............ | 455/518 |
| 2007/0202908 A1 * | 8/2007 | Shaffer et al. | ............ | 455/518 |
| 2008/0227473 A1 * | 9/2008 | Haney | ............ | 455/457 |
| 2008/0319863 A1 * | 12/2008 | Jung et al. | ............ | 705/14 |
| 2009/0176484 A1 * | 7/2009 | Lee | ............ | 455/415 |

OTHER PUBLICATIONS

Martin Tetloff: "Computer aided dispatch (CAD)"[Online'] Oct. 27, 2000, XP002507445, Retrieved from the Internet: URL:http://www.lizardcity.com/CAD.pdf>, [retrieved on Dec. 09, 2008], p. 8, line 1-p. 9, last line, p. 10, line 31-p. 13, last line.

(Continued)

*Primary Examiner* — Rafael Pérez-Gutiérrez
*Assistant Examiner* — Frank Donado
(74) *Attorney, Agent, or Firm* — Wall & Tong, LLP

(57) ABSTRACT

The invention includes a method and apparatus for displaying and controlling information for managing an event. A method according to one embodiment includes displaying accountability information associated with a unit deployed to the event where the accountability information is indicative of accountability of the unit with respect to at least one function to be performed for the event, displaying communication information in a manner for facilitating communications for the event, and displaying status information associated with the at least one unit deployed to the event, wherein the information is displayed in a manner tending to enable control of the information for managing the event.

18 Claims, 14 Drawing Sheets

OTHER PUBLICATIONS

Zoll, Data Systems: "RescueNet Dispatch"[Online] 2006, XP002507446, Retrieved from the Internet: URL:http://www.zoll.com/uploadedFiles/Products/RescueNet/Dispatch$_{13}$ FINAL_022706.pdf>[retrieved on Dec. 9, 2008], p. 2, column 1, line 1-p. 2, column 4, last line.

Norman P. Coleman: "Combat Decision Aid Software (CDAS) for Network Centric Warfare/Effects Based Fires" [Online] 2004, XP002507447, Retrieved from the Internet: URL: http://www.dtic.mil/ndia/2004armaments/DayII/SessionI/12_Coleman_Network_Centric_Warfare.pdf>[retrieved on Sep. 12, 2008], p. 6-p. 8;, p 10-p. 15.

Norman P. Coleman: "Combat decision aid technology for network centric operations" Proceedings of SPIEE, [Online] 2003, XP002507448, Retrieved from the Internet: URL:http://spiedl.aip.org/getpdf/servlet/GetPDFServlet?filetype=df &id=PSISDG005101000001000121000001&idtype=cvips &prog=normal>[retrieved on Dec. 9, 2008] the whole document.

David Abusch-Magder et al: "911-Now: A Network on Wheels for Emergency Response and Disaster Recovery Operations" Bell Labs Technical Journal, Wiley, CA, US, vol. 11, No. 4, Jan. 1, 2007, pp. 113-133, XP001504855 ISSN: 1089-7089, the whole document.

Ulf Hassgard: "The lowest echelon in Network Centric Warfare" Swedish National Defense College, [Online] Dec. 3, 2002 92002-12-03), XP002507449, Retrieved from the Internet: URL:http://www.annalindhbiblioteket.se/publikationer//uppsatser/2002/chpt002/hassgaard_2052.pdf>[retrieved on Dec. 9, 2008]the whole document.

Miller W T et al: "Consolidated advanced technologies for law enforcement program" Intelligent Transportation Systems, 2004. Proceedings.The7thInternational IEEE Conference on Washington, D.C., USA Oct. 3-6, 2004, Piscataway, NJ, USA, IEEE, Oct. 3, 2004, pp. 256-261, XP010772408, ISBN: 978-0-7803-8500-9, the whole document.

International Search Report & Written Opinion, PCT US2008/006988, dated Dec. 30, 2008, Lucent Technologies Inc., Applicant; 15 pages.

* cited by examiner

METHOD AND APPARATUS FOR PRESENTING AND CONTROLLING INFORMATION FOR MANAGING AN EVENT

CROSS-REFERENCE TO RELATED APPLICATIONS

This application claims the benefit of U.S. Provisional Application No. 60/934,666, filed Jun. 15, 2007, which is incorporated by reference herein in its entirety.

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

SUMMARY OF THE INVENTION

Various deficiencies in the prior art are addressed through a method and apparatus for displaying and controlling information for managing an event. In one embodiment, a method includes displaying accountability information associated with a unit that is deployed to the event where the accountability information is indicative of accountability of the unit with respect to at least one function to be performed for the event, displaying communication information in a manner for facilitating communications for the event, and displaying status information associated with the at least one unit deployed to the event, wherein the information is displayed in a manner tending to enable control of the information for managing the event.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context a rapidly deployable wireless network (denoted herein as a 911 network on wheels, i.e., 911-NOW); however, the present invention is applicable to RF transmit power adjustments performed in various other wireless networks that may or may not be rapidly deployable networks. A 911-NOW network is formed by placing a 911-NOW node(s) on a mobile platform (s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
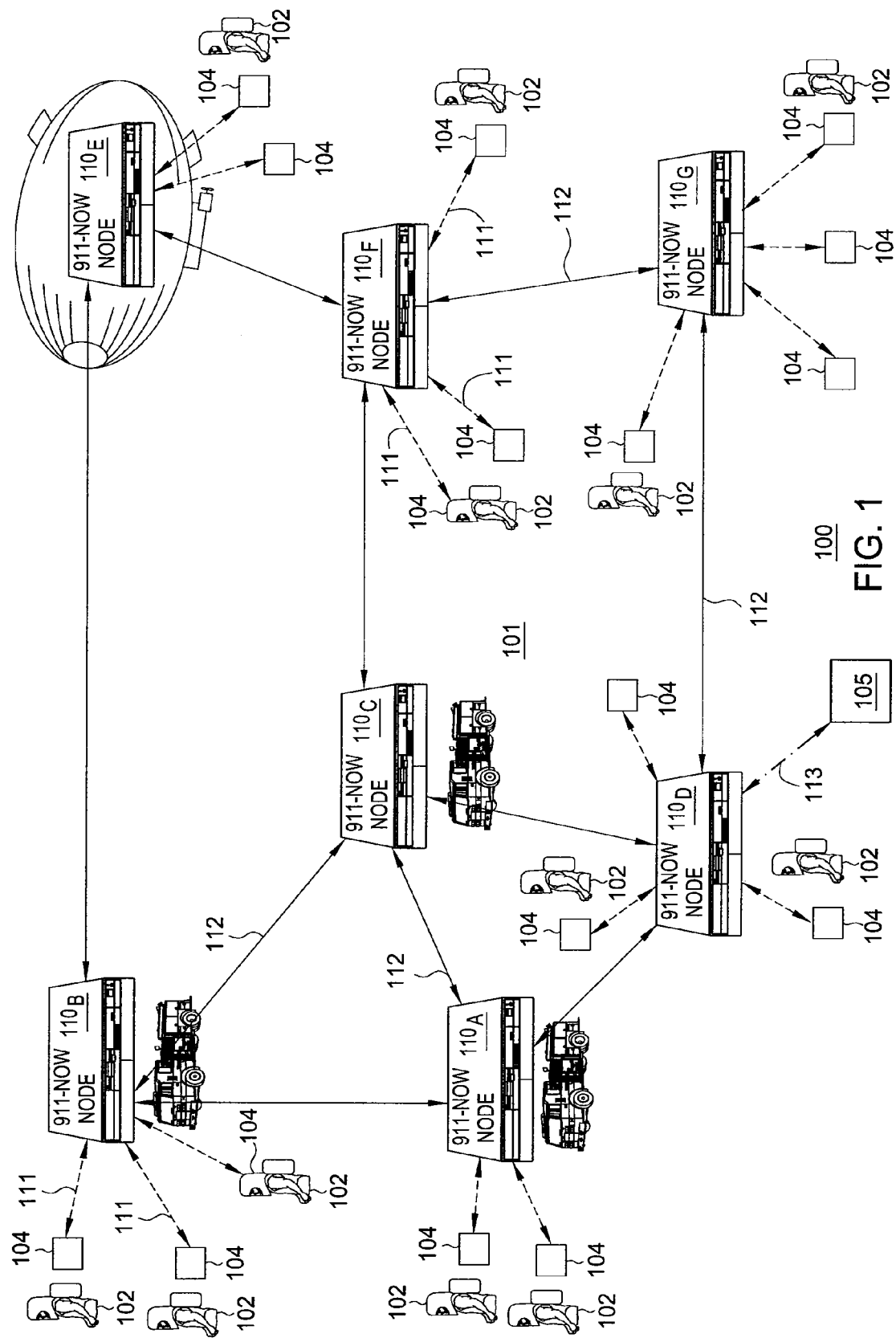
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes 110$_A$-110$_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-

NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users 102 may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment. The wireless user devices 104 also may include various other types of emergency equipment (depending on the type of emergency, severity of the emergency, logistics of the emergency site, and various other factors).

The wireless user devices 104 may include wireless devices carried by emergency personnel for communicating with other emergency personnel (e.g., other emergency personnel at the emergency site, other emergency personnel not at the emergency site, and the like), receiving information for use in dealing with situations at the emergency site, collecting information at the emergency site, monitoring conditions at the emergency site, and the like, as well as various combinations thereof. For example, wireless user devices 104 may include devices such as mobile phones, walkie-talkies, wireless headsets, personal digital assistants, laptops, and the like, as well as various combinations thereof.

The wireless user devices 104 may include other equipment which may be used at emergency site 101. For example, wireless user devices 104 may include video cameras, monitors (e.g., for monitoring breathing, pulse, and other characteristics of emergency responders; for monitoring temperature, precipitation, and other environmental characteristics of the emergency site; and the like), sensors (e.g., for detecting air-quality changes, for detecting the presence of chemical or biological agents, for detecting radiation levels, and the like), and the like, as well as various combinations thereof. The wireless user devices 104 may include any other equipment which may be useful to users 102 at emergency site 101.

With respect to detectors, sensors, and other similar devices, wireless user devices may include audio detectors (e.g., which can detect when a user begins speaking, which can detect various different noises, and the like, as well as various combinations thereof), motion detectors, health monitors (e.g., for monitoring breathing, heart rate, temperature, and the like, as well as various combinations thereof), environmental sensors (e.g., sound sensors, temperature sensors, heat sensors, pressure sensors, light sensors, proximity sensors, sensors capable of detecting biological agents, sensors capable of detecting chemical agents, sensors capable of detecting radiation, and the like), and the like, as well as various combinations thereof.

The wireless user devices 104 may be utilized by users 102 at the emergency site 101 in various different ways. The wireless user devices 104 may be carried by users 102. For example, users 102 may carry mobile phones, video cameras, and the like. The wireless user devices 104 may be affixed to uniforms worn by users 102 and/or other equipment carrier by users 102. For example, wireless headsets may be built into helmets worn by users 102, sensors and monitors may be built into or affixed to uniforms worn by users 102, and the like. The wireless user devices 104 may be deployed at the emergency site (e.g., video cameras positioned at specific locations at the emergency site, sensors and/or monitors deployed at specific locations of the emergency site, and the like). The wireless user devices 104 may be used in various other ways at emergency site 101.

As depicted in FIG. 1, a 911-NOW-based network is established at the emergency site 101 by deploying 911-NOW nodes 110 (illustratively, 911-NOW nodes 110$_A$-110$_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node 110$_A$ is deployed using a fire engine, 911-NOW node 110$_B$ is deployed using a fire engine, 911-NOW node 110$_C$ is deployed using a fire engine, 911-NOW node 110$_D$ is deployed as a standalone node, 911-NOW node 110$_E$ is deployed using a blimp, 911-NOW node 110$_F$ is deployed as a standalone node, and 911-NOW node 110$_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various services, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-

NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes 110$_A$ and 110$_B$, 911-NOW nodes 110$_A$ and 110$_C$, 911-NOW nodes 110$_A$ and 110$_D$, 911-NOW nodes 110$_B$ and 110$_C$, 911-NOW nodes 110$_C$ and 110$_D$, 911-NOW nodes 110$_B$ and 110$_E$, 911-NOW nodes 110$_C$ and 110$_F$, 911-NOW nodes 110$_D$ and 110$_G$, 911-NOW nodes 110$_E$ and 110$_F$, and 911-NOW nodes 110$_F$ and 110$_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node 110$_D$ are supported using a wireless management connection 113 established between management device 105 and 911-NOW node 110$_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution—Data Optimized (1×EV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
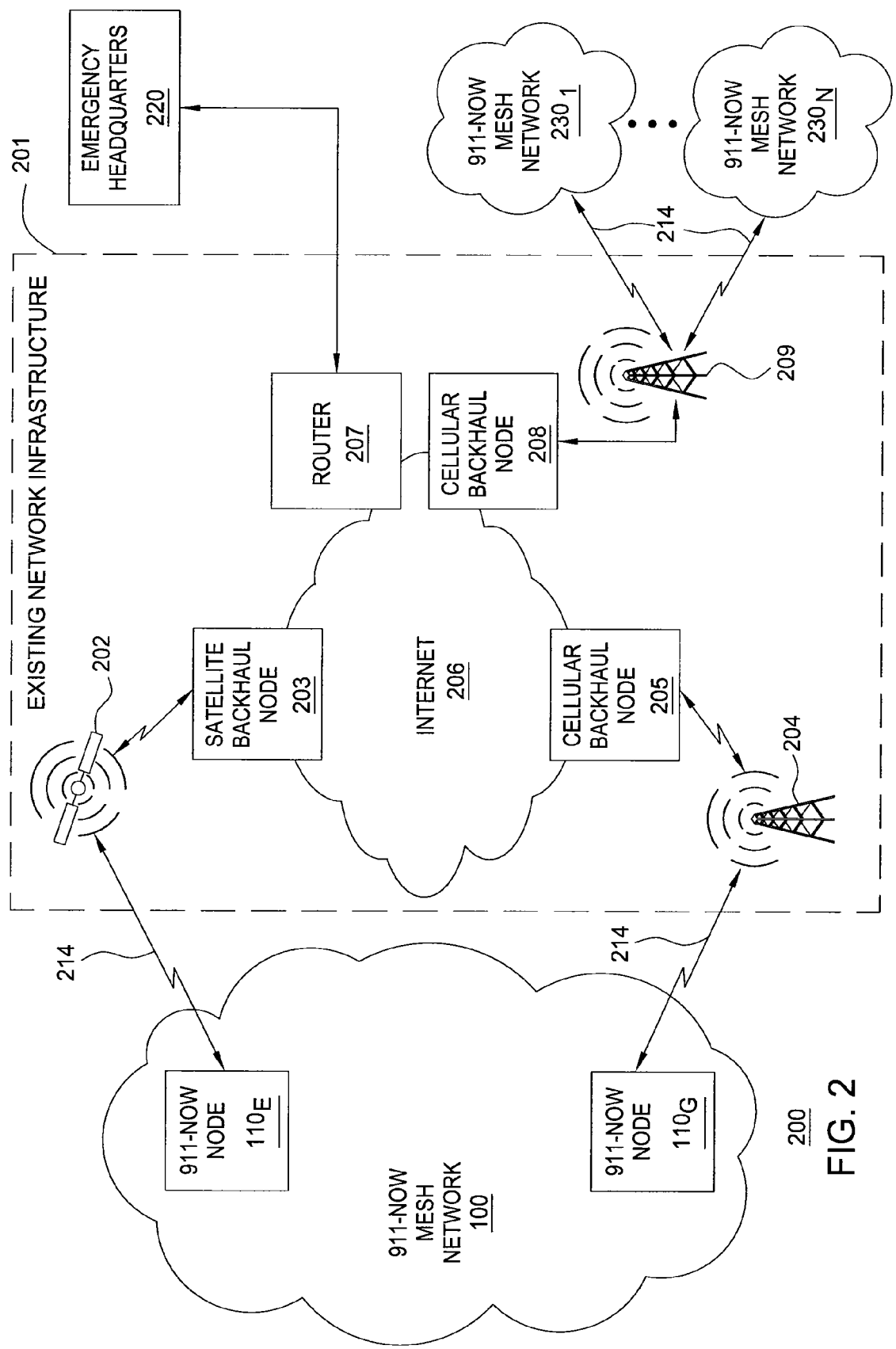
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node $110_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node $110_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, LTE, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
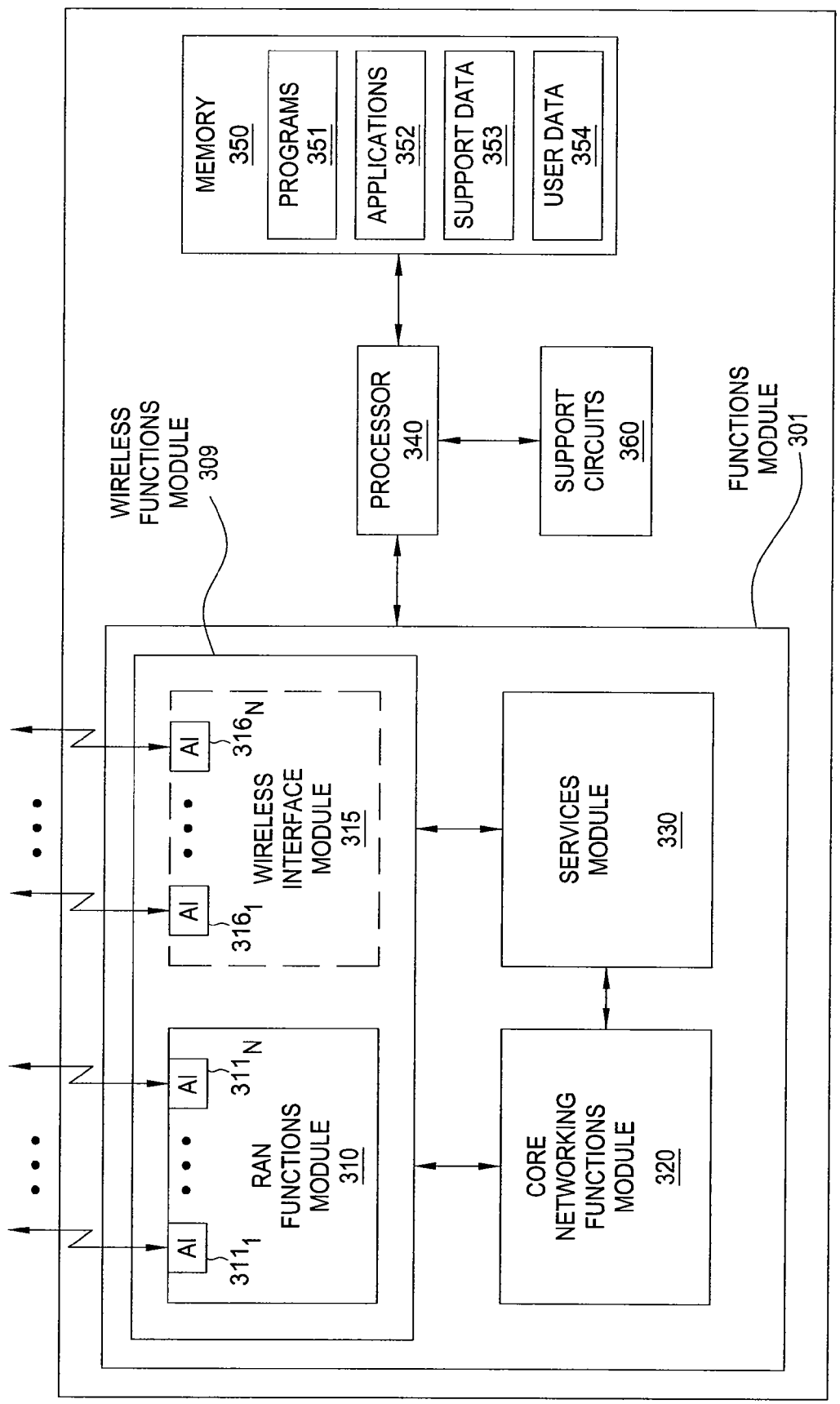
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

Figure 4:
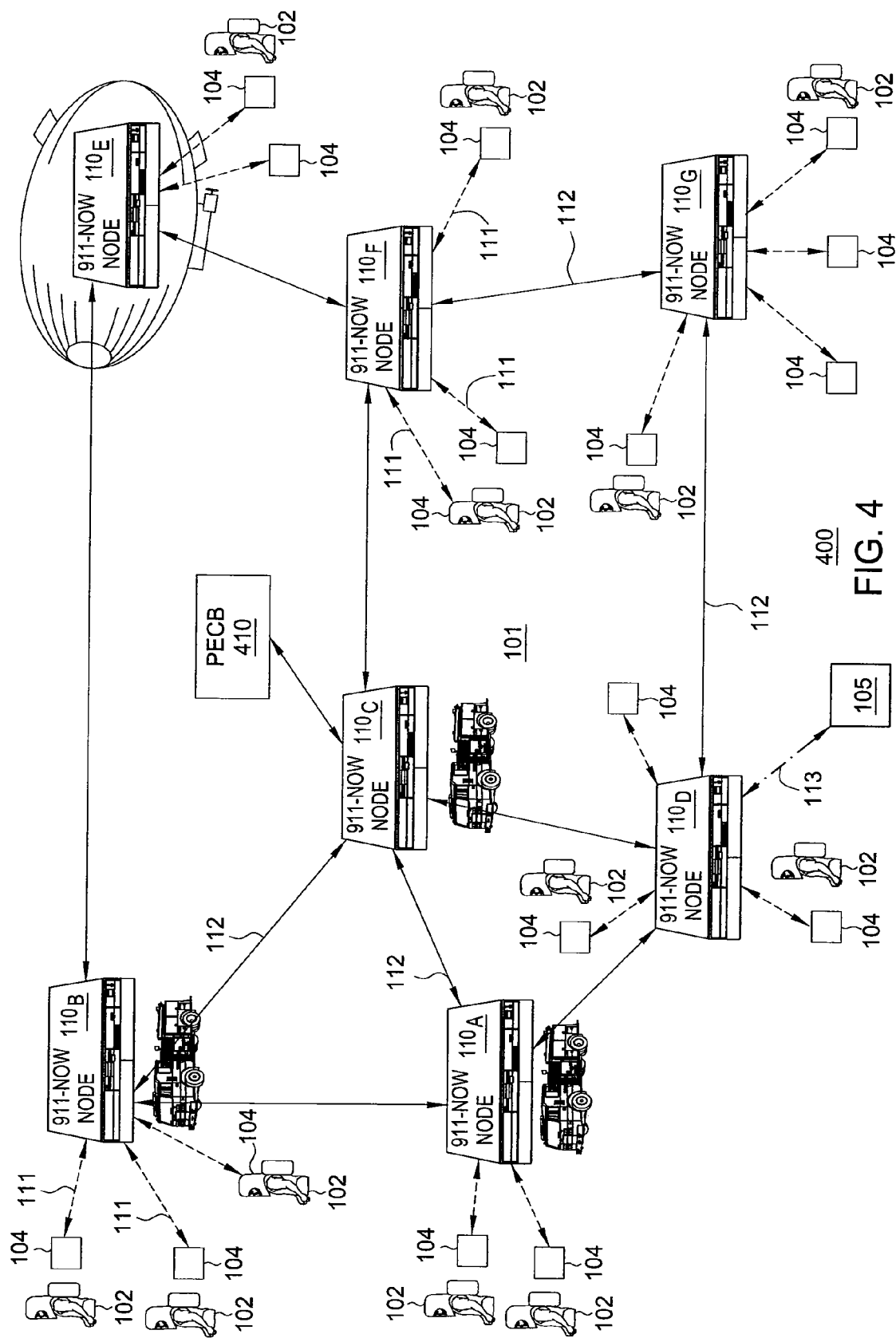
FIG. 4 depicts the standalone 911-NOW communication network architecture of FIG. 1 including a Portable Electronic Command Board (PECB)

FIG. 4 depicts the standalone 911-NOW communication network architecture of FIG. 1 including a Portable Electronic Command Board (PECB). Specifically, PECB 410 is a control device adapted for use by one or more commanders to perform different control functions at emergency site 101. For example, the control functions may include managing the 911-NOW communication network established at emergency site 101, managing the users 102 responding at emergency site 101, managing information (e.g., information exchanged at emergency site 101, information exchanged between emergency site 101 and other locations, any other information that may be associated with emergency site 101), and the like, as well as various combinations thereof. For example, the commander(s) that uses PECB 101 may include one or more of the users 102, or any other person who may be responsible for performing control functions at emergency site 101.

The PECB 410 communicates with wireless user devices 104 via 911-NOW nodes 110. In one embodiment, PECB 410 may support a wired connection to one of the 911-NOW nodes 110. In one embodiment, PECB 410 may support wireless connectivity to one or more of the 911-NOW nodes 110. The PECB 410 may also support wireless connectivity to existing network infrastructure (e.g., for communicating with other emergency sites, for communicating with one or more command centers, for accessing information from different networks (e.g., information from private networks, public Internet searches, and the like), and the like, as well as various combinations thereof. The PECB 410 may support any other communications required in support of the functions of PECB 410 depicted and described herein.

The PECB 410 may be implemented in many different ways. In one embodiment, for example, PECB 410 may be implemented as a laptop, or at least have a laptop-like design. In one such embodiment, PECB 410 may be a rugged laptop that is built to handle different extreme conditions which may be experienced at an emergency site (e.g., a laptop or other similar device including environmental hardening). The PECB 410 may be implemented in various other ways.

As described herein, PECB 410 is adapted to enable performance of different functions which may be required at emergency site 101, including monitoring and managing the 911-NOW communication network established at emergency site 101 (e.g., configuring 911-NOW nodes 110, setting up any communication connections which may be required, monitoring the health and performance of any communications supported by the 911-NOW nodes 110, and the like), monitoring and managing users 102 deployed to emergency site 101 (e.g., communicating with users 102, directing the actions of individual users 102 or teams of users 102, receiving and analyzing information collected by users 102 using wireless user devices 104, and the like), and the like, as well as various combinations thereof. The PECB 410 may be used to perform many other functions, as depicted and described herein.

The PECB 410 provides a user interface which enables a user (or users) to perform such functions which may be required at emergency site 101. The PECB 410 supports one or more user interaction interfaces (e.g., touch screens, keyboards, audio inputs, data inputs, and the like, as well as various combinations thereof). The PECB 410 also supports one or more user presentation interfaces (e.g., one or more display screens, audio outputs, and the like, as well as various combinations thereof). The PECB 410 is adapted for presenting information in various different ways. The operation of PECB 410 in performing such functions, including graphical presentation and manipulation of information associated with various management functions, may be better understood with respect to FIG. 5-13.

Figure 5:
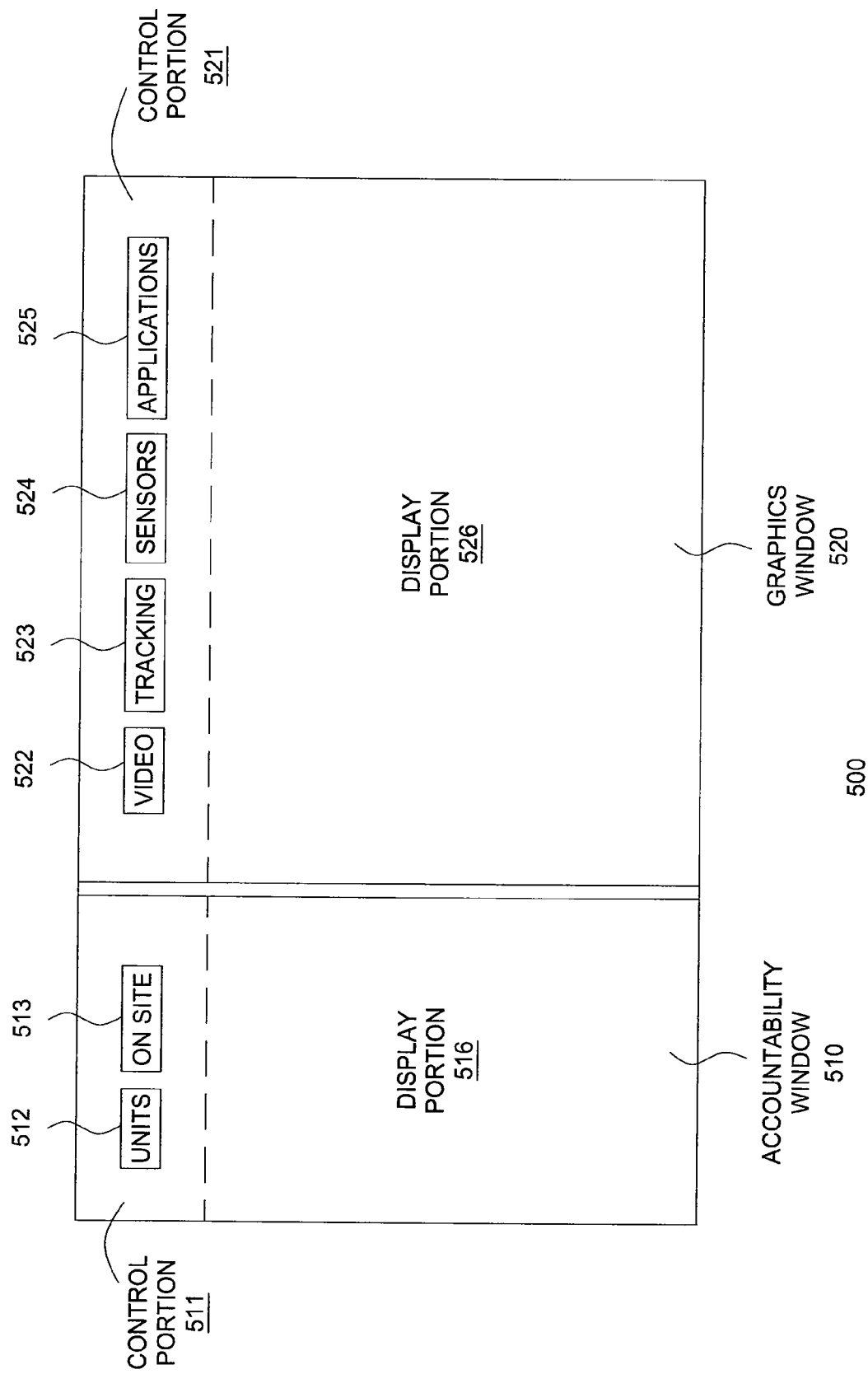
FIG. 5 depicts a high-level block diagram of a user interface of the PECB of FIG. 4.

FIG. 5 depicts a high-level block diagram of a user interface of the PECB of FIG. 4. As depicted in FIG. 5, user interface 500 includes an accountability window 510 and a graphics window 520. The accountability window 510 includes a control portion 511 and a display portion 516. The graphics window 520 includes a control portion 521 and a display portion 526. The control portions 511 and 521 may be implemented in any manner. In one embodiment, control portions 511 and 521 may be implemented as toggle bars having multiple tabs which, when selected, enable display of different information in the display portions 516 and 526.

The accountability window 510 enables display of personnel accountability information and, optionally, personnel-related configuration functions (e.g., setting up calling groups, displaying personnel phonebook information, and the like). The accountability window 510 may also display status information associated with emergency personnel (e.g., individual personnel, groups of personnel, and the like). The control portion 511 controls the information that is displayed in display portion 516. The control portion 511 and/or display portion 516 may also control information that is displayed in display portion 526.

The graphics window 520 enables display of information which may be useful for managing operations at emergency site 101, such as displaying video streams from video cameras associated with emergency personnel, displaying tracking information (e.g., for tracking locations of emergency personnel, for directing movements of emergency personnel, and the like), displaying status monitoring information (e.g., from sensors, detectors, and the like), enabling use of various other applications (e.g., Internet browsing capabilities, file transfers, and the like), and the like, as well as various combinations thereof. The control portion 521 (alone, or in combination with control portion 511 and/or display portion 516) controls the information that is displayed in display portion 526.

The control portion 511 includes a plurality of tabs for controlling the information that is displayed in display portion 516. The control portion 511 includes a UNITS tab 512 and an ON SITE tab 513. The control portion 521 includes a plurality of tabs for controlling the information that is displayed in display portion 526. The control portion 521 includes a VIDEO tab 522, a TRACKING tab 523, a SENSORS tab 524, and an APPLICATIONS tab 525. The information that is displayed in display portion 526 when each of these tabs is selected may be better understood with respect to the examples depicted and described with respect to FIG. 6-FIG. 12.

Figure 6:
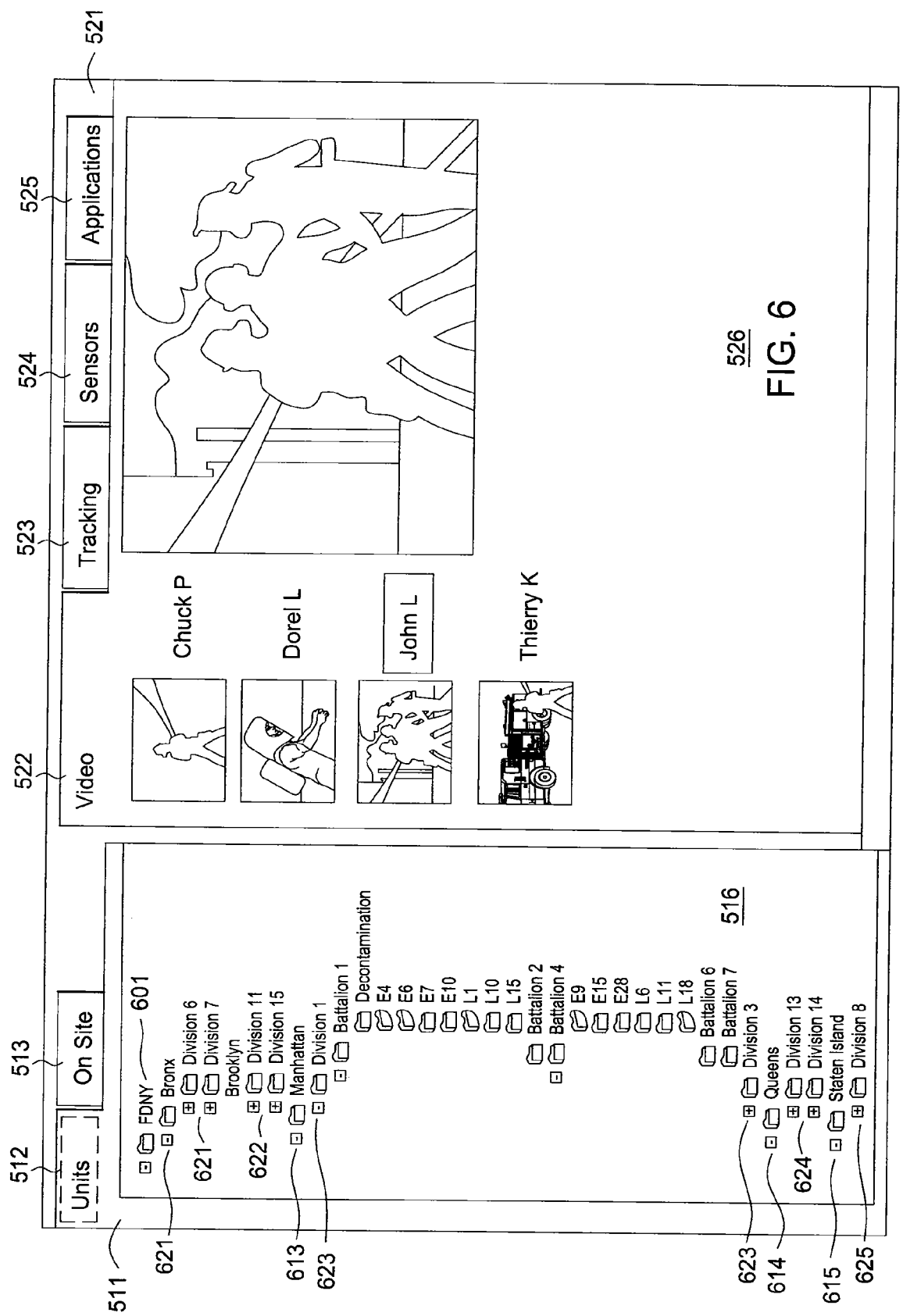
FIG. 6 depicts the user interface of FIG. 5 with the UNITS tab selected.

FIG. 6 depicts the user interface of FIG. 5 with the UNITS tab selected. As depicted in FIG. 6, selection of the UNITS tab 512 from control portion 511 results in display of accountability information in the display portion 516 of the accountability window 510. The accountability information displayed in display portion 516 may include accountability information for any group or groups. For example, the organizational structure may be an organizational structure of an emergency response group (or any other group, depending on the type of event for which the 911-NOW network is deployed). In FIG. 6, for example, the organizational structure that is displayed in the display portion 516 is the organizational structure of the New York City Fire Department (FDNY).

The accountability information displayed in display portion 516 may include any accountability information associated with the group. In one embodiment, for example, the accountability information displayed in display portion 516 is an organizational structure of the group. The accountability information may include any other accountability information (e.g., chain of command information, unit assignment information, and the like, as well as various combinations thereof). In one embodiment, the accountability information includes accountability information for the entire group, irrespective of whether or not the group, or a portion(s) of the group, is deployed at an emergency site.

The accountability information that is displayed in display portion 516 may be preloaded and/or entered in real time. The accountability information that is displayed in display portion 516 may also be customized at any time. For example, the accountability information may be customized offline when the organizational structure of the group changes, in real time during an emergency in which the commander deems it necessary to modify the organizational structure (e.g., where the chain-of-command needs to be changed, where one or more units, battalions, divisions, or other groups are directed to response to an emergency site outside of their normal response area, and the like), or at any other time or in response to any other situation, as needed.

The organizational structure may be displayed in any manner adapted for providing information about the organizational structure of the associated group. In one embodiment, for example, the organizational structure may be displayed using folders that are organized in a hierarchical manner. The folders may be expandable/collapsible to reveal/hide subfolders that form part of the folder being expanded/collapsed. In this manner, any number of hierarchical levels of organizational structure may be supported. The organizational structure may be displayed in any other manner for providing information about the organizational structure of the group.

For example, where the highest level of the organizational hierarchy is all emergency response organizations in an area (e.g., where the person using PECB 410 is the emergency coordinator for all emergency response departments in the area), the next lower level of the hierarchy may be broken out by department (fire department, police department, medical responders, and the like), by location (e.g., by geographical locations or organizational boundaries), and the like, as well as various combinations thereof. The lower levels of the hierarchy may then be broken out by different units within each of the different departments, locations, and so forth, depending on the manner in which the organizational hierarchy is presented. The different units may then be broken further to the individual emergency responder level.

For example, where the highest level of the organizational hierarchy is one emergency response department in an area (e.g., where the person using PECB 410 is the chief of the fire department, or any other department), the next lower level of the hierarchy may be broken out by geographical locations, units, and the like, as well as various combinations thereof. For example, where the second level of the organizational hierarchy is organized by location, the third level of the hierarchy may then be broken out by different units operating within each of the different locations. The different units may then be broken out into different sub-units (e.g., battalions within a division, units within a battalion, and the like). The different units and/or sub-units may then be broken further to the individual emergency responder level. An example is depicted in FIG. 6.

As depicted in FIG. 6, accountability information displayed in display portion 516 is accountability information for the New York Fire Department. The organizational hierarchy used in this example displays a FDNY folder 601 at the first level of the hierarchy. The FDNY folder 601 is expandable to display folders for each of the different regions of NYC in which the FDNY operates (illustratively, a Bronx folder 611, a Brooklyn folder 612, a Manhattan folder 613, a Queens folder 614, and a Staten Island folder 615, each of which is displayed as an expandable/collapsible folder). Specifically, the region folders are each individually expandable to display different divisions operating in the regions.

As depicted in FIG. 6, each of the region folders includes subfolders. For example, the Bronx folder 611 includes folders 621 for Division 6 and Division 7, the Brooklyn folder 612 includes folders 622 for Division 11 and Division 15, the Manhattan folder 613 includes folders 623 for Division 1 and Division 3, the Queens folder 613 includes folders 624 for Division 13 and Division 14, and the Staten Island folder 625 includes a folder 625 for Division 8, each of which is displayed as an expandable/collapsible folder. Specifically, the division folders are each individually expandable to display the battalions (and associated units) operating in the different divisions.

As further depicted in FIG. 6, the division folder 623 for Division 1 of the Manhattan region of the FDNY has been expanded to display folders for the five battalions which belong to Division 1 (illustratively, Battalions 1, 2, 4, 6, and 7). Additionally, two of the battalion folders have been expanded to display the different units which make up the battalions. Specifically, the battalion folder for Battalion 1 is expanded to display folders for the eight units which make up Battalion 1 (namely, Decontamination, E4, E6, E7, E10, L1, L10, and L15) and the battalion folder for Battalion 4 is expanded to display folders for the six units which make up Battalion 4 (namely, E9, E15, E28, L6, L11, and L18).

As described herein, selection of information in display portion 516 may be used in conjunction with selection of one of the tabs of control portion 521 in order to control display of information in display portion 526. In the example depicted in FIG. 6, the unit folder for the unit E4 of Battalion 1 of Division 1 in Manhattan has been selected in display portion 516 and the VIDEO tab 522 is selected in control portion 521, thereby resulting in display of streaming video in display portion 526. The display of streaming video in display portion 526 may be better understood with respect to FIG. 8.

Figure 7:
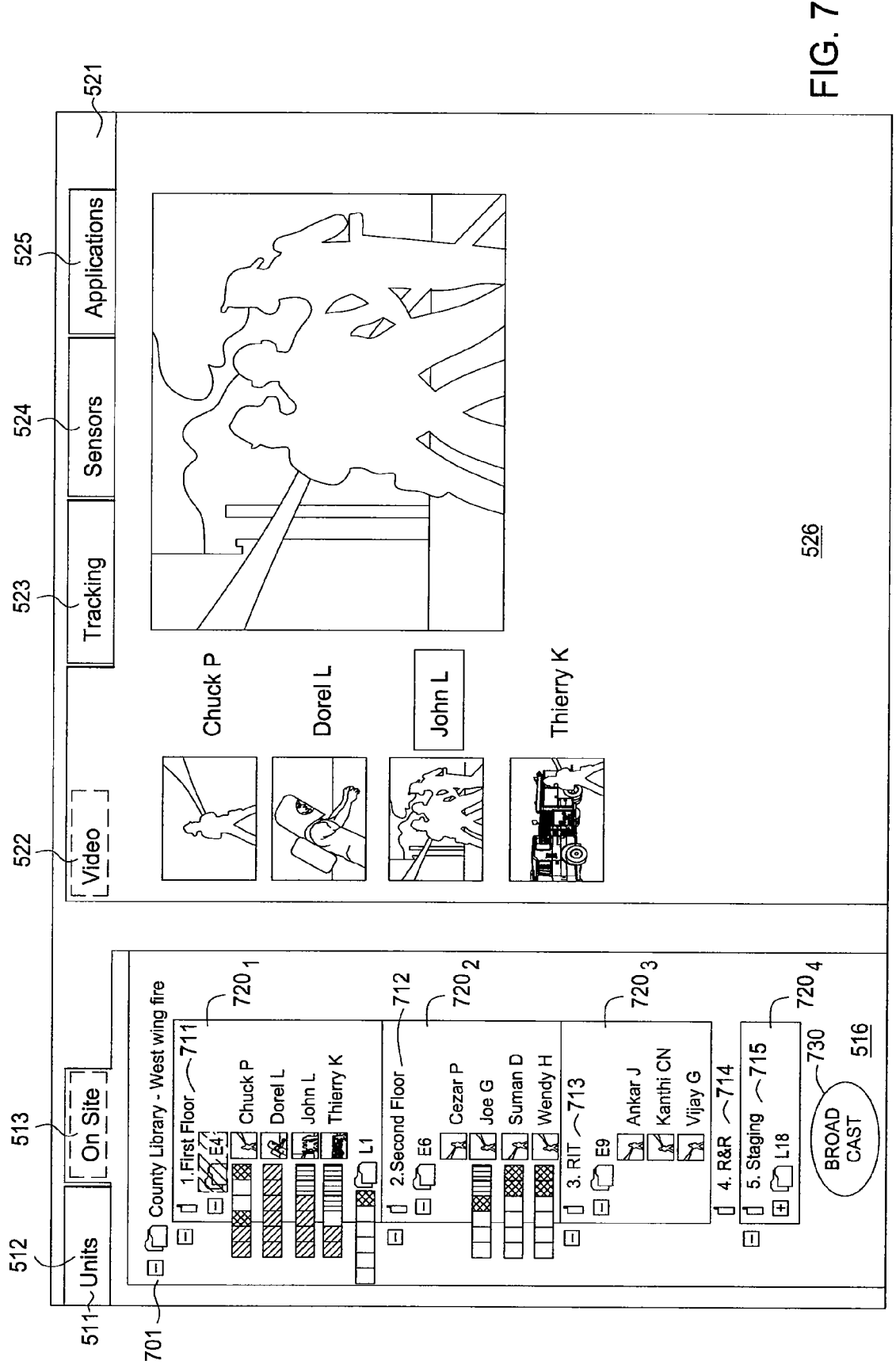
FIG. 7 depicts the user interface of FIG. 5 with the ON SITE tab selected.

FIG. 7 depicts the user interface of FIG. 5 with the ON SITE tab selected. As depicted in FIG. 7, selection of the ON SITE tab 513 from control portion 511 results in display of accountability information in display portion 516 of accountability window 510. The accountability information displayed in display portion 516 includes information on portions of the group (e.g., units) deployed at an emergency site. For example, the accountability information may include information such as which units are deployed in which locations, which emergency personnel belong to which units, which units/personnel belong to which calling group or groups, status information associated with units/personnel, and the like, as well as various combinations thereof. In FIG. 7, for example, accountability information displayed in display portion 516 is accountability information that is associated with units of the FDNY that have been deployed to a fire at the County Library.

The accountability information that is displayed in display portion 516 may be organized in any manner adapted for providing information about the emergency response units, and the emergency personnel of the emergency response units, deployed at an emergency site.

In one embodiment, for example, the accountability information may be organized using folders that are organized in a hierarchical manner. In such embodiments, the folders may be expandable/collapsible to reveal/hide other folders (and/or other relevant information) which may be associated with the folder that is being expanded/collapsed. The folders may be organized in any manner (e.g., based on the organizational hierarchy of the department(s) that have units deployed at the emergency site, the locations in which units are operating at the emergency site, and the like, as well as various combinations thereof). The accountability information may be organized in any other manner adapted for providing accountability information associated with units and/or emergency personnel deployed to an emergency site.

For example, where the emergency site is a group of buildings in which there is a disaster, the highest level of the on-site hierarchy may be the area in which the buildings are located, and the next lower level of the hierarchy may be broken out into the different buildings affected by the disaster. For example, where the emergency site is a building in which there is a fire, the highest level of the on-site hierarchy may be the name of the building in which the fire is located, and the next lower level of the hierarchy may be broken out into the different floors of the building. The on-site hierarchy may be organized using other types of hierarchical organization, depending on various factors (e.g., the type of emergency, the number of units/personnel responding to the emergency site, preferences of the commander(s) managing the emergency site, and the like, as well as various combinations thereof).

In such embodiments, lower levels of the on-site hierarchy may then be broken out into the different units and, further, to the individual emergency responder level (e.g., so that the commander(s) managing the emergency site knows which of the emergency personnel are operating with each deployed unit, can communicate with emergency responders based on calling groups to which the emergency responders are assigned, can obtain unit-level and/or individual-level status information, and can easily review any other relevant information associated with units and/or emergency personnel deployed at the emergency site). An example is depicted is FIG. 7.

As depicted in FIG. 7, accountability information displayed in display portion 516 is accountability information for response units of the New York Fire Department that have been deployed to a fire at the County Library. The organizational hierarchy used in this example displays a County Library folder 701 at the first level of the hierarchy, and the County Library folder 701 is expandable to display subfolders which enable the commander to manage the response to the fire. The subfolders correspond to different locations at the emergency site (and, optionally, functions to be performed at the emergency site).

Specifically, County Library folder 701 is expandable to display: (1) a folder associated with the first floor of the County Library (First Floor folder 711); (2) a folder associated with the second floor of the County Library (Second Floor folder 712); (3) a folder associated with any fire department units dedicated to emergency egress (RIT folder 713), a folder associated with any fire department units currently resting, e.g., in between shifts of fighting the fire (R&R folder 714); and (5) a folder associated with any fire department units currently in a staging area for preparing to fight the fire (Staging folder 715).

As depicted in FIG. 7, each location/function folder may include one or more subfolders. In one embodiment, the subfolders may identify units that are currently located at that location (or associated with that function). For example, the First Floor folder 711 includes folders indicating that units E4 and L1 (from Battalion 1) are currently working on the First Floor, the Second Floor folder 712 includes a folder indicating that the unit E6 (from Battalion 1) is currently working on the Second Floor, the RIT folder 713 includes a folder indicating that the unit E9 (from Battalion 4) is currently on standby to provide emergency egress from the County Library if needed, the R&R folder 714 does not include any folders (i.e., none of the units that responded to the fire are currently resting), and the Staging folder 715 includes a folder indicating that unit L18 (from Battalion 4) is currently staging in preparation to fight the fire.

As further depicted in FIG. 7, the unit folders are each individually expandable/collapsible to display/hide the emergency responders of the units. The E4 unit folder has been expanded to display the members of the E4 unit, namely, Chuck P, Dorel L, John L, and Thierry K. The L1 unit folder has not been expanded to display the members of the L1 unit. The E6 unit folder has been expanded to display the members of the E4 unit, namely, Cezar P, Joe G, Suman D, and Wendy H. The E9 unit folder has been expanded to display the members of the E9 unit, namely, Ankar J, Kanthi C N, and Vijay G. The L18 unit folder has not been expanded.

The accountability information that is displayed in display portion 516 includes a subset of the accountability information available in display portion 516 when the UNITS tab 512 is selected (e.g., accountability information that is associated with the unit of the group that have been deployed to the emergency site). The display portion 516 enables the emergency commander to monitor and manage the response at the emergency site (e.g., using the user interface in order to review the accountability information that is displayed in display portion 51 and manipulate the accountability information that is displayed in display portion 516 as conditions at the emergency site change).

For example, if the commander determines that the L1 unit currently operating on the first floor of the library is no longer needed on the first floor, the commander may instruct the members of the L1 unit to leave the first floor area and go to the rest and relaxation area in order to get some rest. In this case, in order to reflect this change in deployment of the units at the library, the commander may simply drag the L1 folder from the first floor folder in display portion 516 and drop it on the R&R folder in display portion 516, thereby reflecting the change in accountability of unit L1 at the emergency site.

Thus, the display portion 516 enables the commander to monitor and manage the response to the emergency as conditions change at the emergency site by simple manipulation of the accountability information associated with the emergency site. The commander may perform various other actions via display portion 516 in order to monitor and manage the response at the emergency site, such as modifying the chain of command, reflecting movements of units around the emergency site, reflecting movements of emergency responders between units, and the like, as well as various combinations thereof.

In one embodiment, in addition to displaying information by which an emergency commander may determine accountability at the emergency site, selection of the ON SITE tab 513 enables other functions to be performed.

In one embodiment, selection of ON SITE tab 513 enables the emergency commander to configure and control communications at the emergency site via display portion 516. In one such embodiment, the emergency commander may configure and control communications at the emergency site using calling groups.

The calling groups may be created, modified, and deleted in any manner (e.g., using any sequence of selections, button presses, and the like, depending on the implementation of the user interface for PECB 410). In one embodiment, calling groups may be created using accountability information that is displayed in display portion 516. For example, calling groups may be created by selecting one or more folders of accountability information in the display portion 516 and initiating an action to create a calling group for the selected folders. In another embodiment, calling groups may be created independently of accountability information that is displayed in display portion 516. For example, a calling group may be created by selecting units and/or responders for inclusion in the calling group. The calling groups may be created, modified, and deleted in various other ways.

The calling groups may be organized, displayed, and controlled in any manner. In one embodiment, the calling groups may be organized, displayed, and controlled in conjunction with the accountability information displayed in display portion 516. In another embodiment, calling groups may be organized, displayed, and controlled independently of accountability information. The calling groups used for controlling communications at an emergency site may be organized, displayed, and controlled in various other ways.

As depicted in FIG. 7, the accountability information that is displayed in display portion 516 has been organized into four calling groups having four associated calling group icons $720_1$-$720_4$ (collectively, calling groups icons 720). A first calling group icon $720_1$ is displayed for a calling group that exists for the first floor (and, thus, includes each of the responders of units E4 and L1, which are operating on the first floor). A second calling group icon $720_2$ is displayed for a calling group that exists for the second floor (and, thus, includes each of the responders of unit E6, which are operating on the second floor). A third calling group icon $720_3$ is displayed for a calling group that exists for the RIT responders (and, thus, includes each of the responders of unit E9 that are associated with RIT). A fourth calling group icon $720_4$ is displayed for a calling group that exists for the staging area (and, thus, includes each of the responders of unit L18 which are located at the staging area).

The calling groups may be configured to support communications in any manner.

In one embodiment, each member of a calling group is connected to each of the other members of the calling group upon creation of the calling group such that each member of a calling group may communicate with each of the other members of the calling group at any time by simply speaking. As an example, when Chuck P (from unit E4) talks, he is heard by each of the other members of unit E4 as well as the members of unit L1, all of which belong to the first calling group created for the first floor of the library. In one such embodiment, connections between members of a calling group are established by creating a voice conference for the calling group when the calling group is created (e.g., using a voice conferencing application).

Although primarily depicted and described herein with respect to use of voice conferencing capabilities for facilitating voice communication between members of a calling group, communications between members of a calling group may be facilitated using various other communications capabilities (e.g., in addition to the voice conferencing capabilities or in place of the voice conferencing capabilities). For example, calling groups may be used for video conferencing, texting, file sharing, or any other types of communications, as well as various combinations thereof.

The emergency commander may utilize calling groups to communicate with different combinations of emergency personnel in any manner.

In one embodiment, the emergency commander may communicate with each of the emergency responders of a calling group collectively. The emergency commander may initiate and terminate communication in various different ways. In one embodiment, for example, the emergency commander may be connected to each responder of a calling group simply by clicking on the calling group icon for that calling group in display portion 516 (e.g., one of the calling group icons 720 displayed in display portion 516). In another embodiment, for example, the emergency responder may be connected to each emergency responder of a calling group by highlight the calling group (e.g., highlighting the folders of the accountability information displayed in display portion 516) and making one or more other selections from any of the control portions or display portions. An emergency commander may initiate and/or terminate communications with a calling group (or groups) in various other ways.

In one embodiment, the emergency commander may communicate with a subset of the emergency responders of a calling group. For example, an emergency commander may initiate a connection with all members of a particular unit (e.g., by double clicking the unit folder, by highlighting the unit folder and making one or more other selections from any of the control or display portions, and the like). For example, an emergency commander may initiate a connection with one of the emergency responders (e.g., by double clicking the name of the responder, by highlighting the name of the responder and making one or more other selections from any of the control or display portions, and the like). The emergency commander may communicate with any combination of emergency responders, with or without using established calling groups (e.g., with a subset of the responders of a single unit, with multiple responders of different units, with a subset of the units at the emergency site, and the like, as well as various combinations thereof).

The use of calling groups enables the emergency commander to easily communicate with different combinations of members of different calling groups (e.g., by a simple manipulation of the user interface, such as clicking an icon or a link, highlighting a calling group and pressing one or more buttons, and the like).

Thus, by enabling the emergency commander to communicate with each of the members of each of the calling groups, the use of calling groups enables the emergency commander to more effectively manage operations at an emergency site.

For example, if the commander determines that the L1 unit currently operating on the first floor of the library is no longer needed on the first floor but is needed on the second floor, the commander may instruct the members of the L1 unit to leave the first floor area and go to the second floor. In this case, rather than members of unit L1 having to change their communication frequency in order to communicate with members of unit E6 which is already operating on the second floor, the emergency commander simply switches unit L1 from the first calling group $720_1$ to the second calling group $720_2$. In this manner, the members of unit L1 are quickly configured to communicate with each other, as well as the members of the other unit E6 with which they will be operating. For example, the emergency commander may perform this reconfiguration of calling groups while unit L1 is en route to the second floor so that, upon arriving at the second floor, unit L1 is already configured for communication with other emergency responders operating on the second floor.

From each of the above-described examples, it is clear that the use of calling groups to manage and control communications at an emergency site obviates the need for each of the emergency responders to have to worry about changing their communications configuration (e.g., tuning their radios to a different frequency) as conditions change at the emergency site (e.g., as they change locations at the emergency site) because this function may now be controlled remotely by the emergency commander via the user interface of PECB 410. The use of calling groups provides many other advantages.

In one embodiment, as depicted in FIG. 7, an emergency commander may be provided with a capability to initiate and terminate communications with all of the emergency responders at the emergency site. For example, in one embodiment, selection of ON SITE tab 513 may cause a BROADCAST icon 730 to be displayed in display portion 516. In this case, the emergency commander may communicate with all of the emergency personnel at the emergency site at the same time by merely clicking the BROADCAST button 730 (i.e., this is equivalent to individual selection of each of the calling groups by the emergency commander).

Although depicted and described herein with respect to location-based calling groups, calling groups may be organized in various other ways. For example, the emergency commander may create a site-level calling group including all emergency responders at the emergency site, unit-level calling groups for each unit at an emergency site, function-based calling groups (e.g., a calling group for each responder at the emergency site who is assigned to a ladder engine, a calling group for each responder at the emergency site who is assigned to a water engine, and the like). The emergency commander may assign response units and/or individual emergency responders to different calling groups (e.g., such that units and/or individual responders may belong to multiple calling groups). In other words, any number of calling groups (of any size) may be established. The calling groups may be organized and displayed in any manner.

Although primarily depicted with respect to specific ways in which an emergency commander may communicate with specific combinations of emergency responders, communications between emergency commander(s) and emergency personnel are not limited in this manner. The emergency commander may communicate with a subset of the responders of one unit, multiple responders of different units, multiple units (but not all units deployed at the emergency site), and the like, as well as various combinations thereof. The emergency commander may initiate and terminate communications with any combinations of emergency responders in any manner (e.g., using one or more of highlighting, point-and-click operations, menu selections, and the like, as well as various combinations thereof).

In one embodiment, as depicted in FIG. 7, status information may be displayed in display portion 516. The status information that is displayed in display portion 516 may include any high-level status information which may be of interest to the emergency commander. In the example depicted in FIG. 7, the status information that is displayed is monitoring status information (e.g., status information from monitoring devices associated with each of the emergency personnel that are carrying monitoring devices or have monitoring devices in their emergency equipment), which may be better understood by way of reference to FIG. 10 and FIG. 11. The status information that is displayed in display portion 516 may include any other status information.

For example, as depicted in FIG. 7, some emergency responders at the emergency site have six boxes displayed next to their names in display portion 516. For each of these emergency responders, each of the boxes is indicative of a status of a different type of monitoring device that may be carried by that emergency responder (and an overall status indicator for the emergency responder). For example, for each emergency responder, the six boxes, from left to right, correspond to a self-contained breathing apparatus (SCBA), a personal alert safety system (PASS), a gas detector (GAS), an outside temperature sensor (TEMP), a heart rate monitor (HEART), and an overall status indicator (OVERALL) for that emergency responder.

The status for each of the monitoring devices and overall status may be indicated in various ways. In one embodiment, color coding may be used to indicate status. For example, green, orange, and red may be used to indicate different status levels (e.g., normal conditions, moderately unsafe conditions, and dangerous conditions, respectively). In other embodiments, shapes, lines, and the like may be used to reflect status (e.g., to support color blindness). The appropriate status levels may be detected using thresholds (e.g., when a first threshold is crossed status changes from green to orange and when a second threshold is cross status changes from orange to red). Although depicted and described with respect to specific numbers and types of status levels, status indicators (e.g., specific numbers of colors and specific colors), and the like, the status may be indicated and controlled in various other ways. In one embodiment, if it is known that an emergency responder is not carrying certain monitoring devices, the corresponding status box(es) may either be displayed without status or may be omitted (as depicted in FIG. 7).

In one embodiment, depicted in FIG. 7, where a unit folder has been expanded to display the individual emergency personnel which belong to that unit, status information may be displayed for each of the emergency personnel. In one embodiment, depicted in FIG. 7, where a unit folder has not been expanded to display the individual emergency personnel which belong to that unit, the status information that is displayed may be status information associated with the unit as a whole. In one such embodiment, for example, the status information for the unit as a whole may be determined as some combination of the statuses associated with each of the individual emergency personnel of that unit.

In one embodiment, for example, using the example of green, orange, and red status levels described above, if, for a particular monitoring device, the status level is green for all of the emergency responders in a unit, the associated status level that is displayed for that monitoring device at the unit level is green. In continuation of this example, if the status level is orange for one or more of the emergency responders in a unit (but none of the status levels are red), the associated status level that is displayed for that monitoring device at the unit level is orange. In further continuation of this example, if the status level is red for one or more of the emergency responders in a unit, the associated status level that is displayed for that monitoring device at the unit level is red.

For example, as depicted in FIG. 7, since the OVERALL status level for unit L1 is green, the emergency commander knows (without even having to expand the folder for unit L1), that the overall status for each emergency responder which belongs to unit L1 is also green (and, thus, there is no need for any status-related action to be taken for that response unit at this time). For example, as depicted in FIG. 7, since the HEART status indicators for Joe G, Suman D, and Wendy H are orange, green, and green, respectively (and Cezar P is not carrying a heart rate monitor), if the emergency commander were to collapse the folder for unit E6 the resulting HEART status indicator would be orange (because one of the emergency responders has a HEART status indicator of orange).

Figure 10:
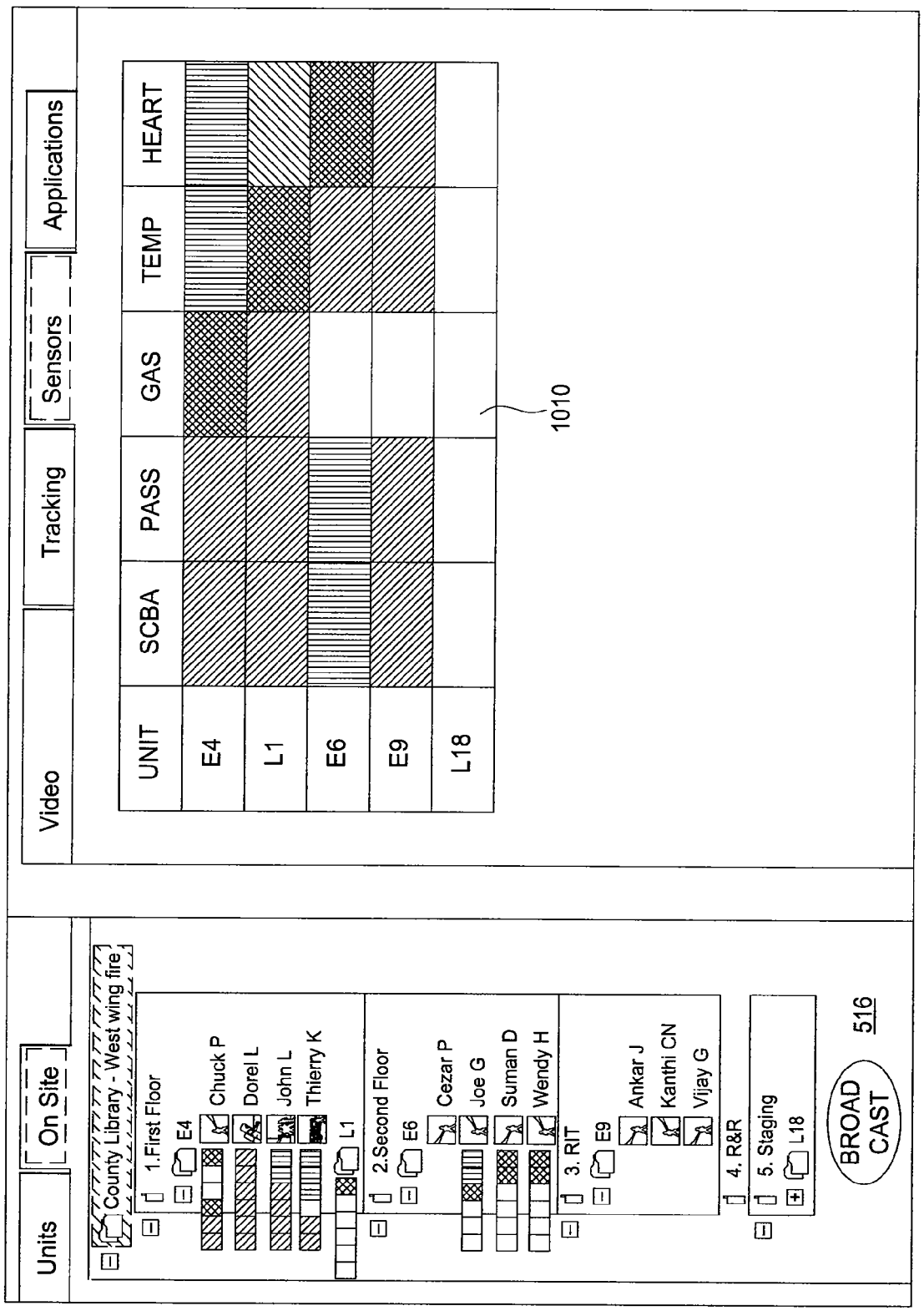
FIG. 10 depicts the user interface of FIG. 5 with the ON SITE and SENSORS tabs selected.
Figure 11:
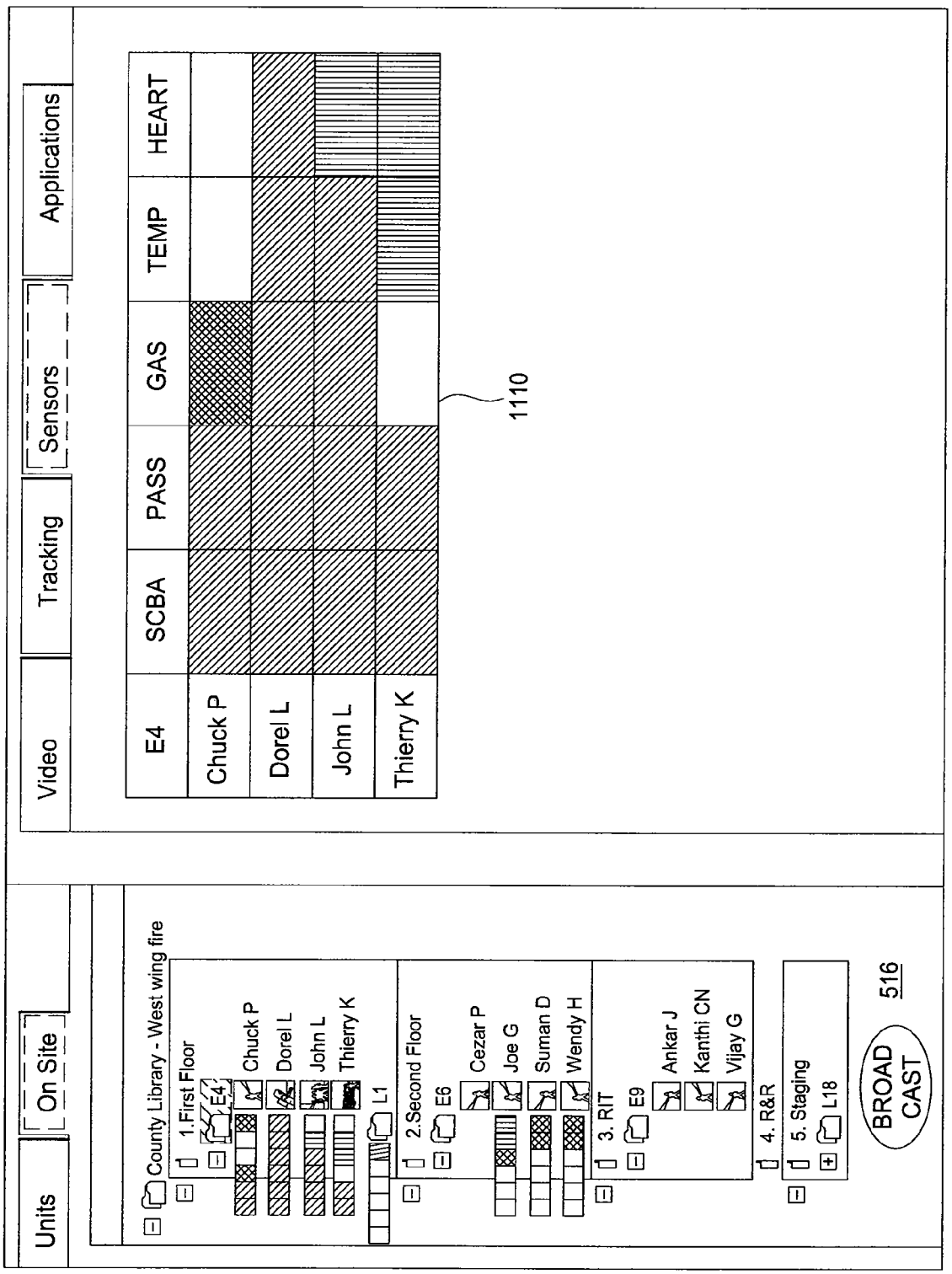
FIG. 11 depicts the user interface of FIG. 5 with the ON SITE and SENSORS tabs selected.

Although primarily depicted and described herein with respect to specific monitoring devices, specific status indicators, specific rules controlling presentation of status information, and the like, presentation of monitoring status information in display portion 516 may be implemented in various other ways, which may be better understood with respect to FIG. 10 and FIG. 11 depicted and described herein. Furthermore, although primarily depicted and described with respect to monitoring status information, various other types of status information (in addition to or in place of monitoring status information) may be displayed in the display portion 516 while the ON SITE tab 513 is selected.

Thus, using ON SITE tab 513 and display portion 516, the emergency commander is able to ascertain which units are deployed in which locations of the emergency site, communicate with any combination of emergency responders using simple point-and-click operations (or any other adequate control means, such as touch screen presses, voice control, and the like), and ascertain important status associated with emergency responders at the emergency site (in this example, monitoring status information associated with the health and well-being of the emergency responders), as well as perform various other functions, all from just one section of only one user interface. Furthermore, the emergency commander is able to review various other information (and perform various other functions) from working window 520 while still reviewing and interacting with accountability window 510.

Furthermore, as described herein, selection of information in display portion 516 may be used in conjunction with selection of one of the tabs of control portion 521 in order to control display of information in display portion 526. In the example depicted in FIG. 7, the unit folder for the unit E4, which is fighting the fire on the first floor of the County Library, has been selected in display portion 516 and the VIDEO tab 522 is selected in control portion 521, thereby resulting in display of streaming video in display portion 526. The display of streaming video in display portion 526 may be better understood with respect to FIG. 8.

Additionally, although omitted for purposes of clarity, in addition to the UNITS tab 512 and the ON SITE tab 513, control portion 511 may include other tabs which, when selected, enable various functions to be performed via display portion 516 and/or display portion 526.

In one embodiment, for example, the control portion 511 may include a CONFIGURATION tab. In one embodiment, for example, selection of the CONFIGURATION tab may enable the emergency commander to manage calling groups. For example, an emergency commander may create new calling groups, modify existing calling groups, delete existing calling groups, merge multiple calling groups into one calling group, split one calling group into multiple calling groups, and the like, as well as various combinations thereof.

In one embodiment, for example, the control portion 511 may include a PHONE BOOK tab. In one embodiment, for example, selection of the PHONE BOOK tab may enable the emergency commander to access important phone numbers. Since the emergency commander will typically have direct access to communicate with each of the emergency responders using simple point-and-click type actions, the phone book may include phone numbers of important people not deployed to the incident (e.g., headquarters, the mayor's office, and the like, as well as various combinations thereof). In one embodiment, selection of one of the phone numbers initiates a point-to-point call with that person.

Although described with respect to using a CONFIGURATION tab to manage calling groups, the CONFIGURATION tab may enable an emergency commander to perform various other types of configurations (e.g., configuring accountability information, such as organizational hierarchy and other related information, configuring settings of the PECB, and the like, as well as various combinations thereof). Although described with respect to using a PHONE BOOK tab to call personnel not deployed to the emergency site, the PHONE BOOK tab may enable an emergency commander to perform other related functions. Additionally, although primarily described with respect to using two additional tabs, any number of additional tabs may be supported in control portion 511.

Figure 8:
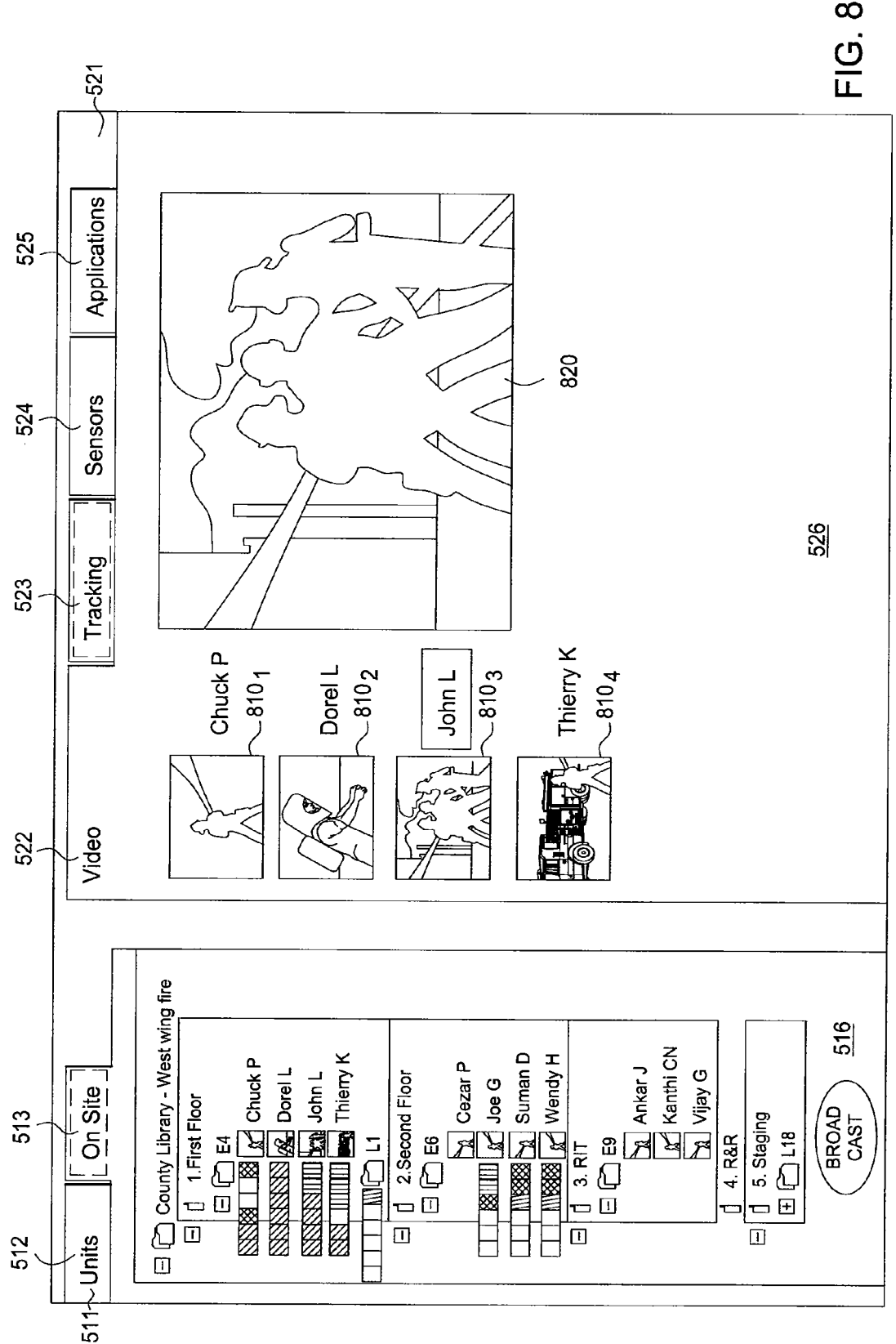
FIG. 8 depicts the user interface of FIG. 5 with the ON SITE and VIDEO tabs selected.

FIG. 8 depicts the user interface of FIG. 5 with the ON SITE and VIDEO tabs selected. As depicted in FIG. 8, with ON SITE tab 513 (or UNITS tab 512) selected in control portion 511 and VIDEO tab 522 selected in control portion 521, selection of a portion of the accountability hierarchy in display portion 516 results in display of associated video streams in display portion 526 (e.g., video streams received from video cameras associated with emergency responders that are associated with the selection that is made in display portion 516).

In one embodiment, selection of an individual emergency responder from the accountability hierarchy in display portion 516 results in display of a video stream in display portion 526. In this embodiment, in which only one video stream needs to be displayed, the video stream may be presented as a low resolution video stream (e.g., as a thumbnail to make room for display of additional video streams in display portion 526) or as a high resolution video stream (e.g., as a full video window which may be reduced in size as needed, such as if there are other video streams that also need to be displayed in the display portion 526).

In one embodiment, selection of multiple emergency responders from the accountability hierarchy (e.g., selection of a unit, selection of emergency responders from different units, and the like) in display portion 516 results in display of multiple video streams in display portion 526. In this embodiment, each of the video streams may be presented as a low resolution video stream (e.g., as a still image or thumbnail video stream). In one such embodiment, one of the low resolution video streams may then be selected from display portion 526, thereby causing the selected video stream to be displayed as a high resolution video stream in display portion 526.

The multiple low resolution videos may be displayed in any manner and, thus, may be selected in any manner. In one embodiment, for example, the low resolution video thumbnails may each operate as selectable icons such that a low resolution video stream may be viewed as a high resolution video stream by simply selecting the corresponding video icon. The low resolution video streams may be presented and selected in many other ways. In one embodiment, identifying information may be presented next to each of the low resolution video streams (e.g., the name of the emergency responder, an icon displaying a picture of the emergency responder, and the like). In such embodiments, the identifying information may be selectable (in addition to the video thumbnail icons or instead of the video thumbnail icons).

As an example, as depicted in FIG. 8, with VIDEO tab 522 selected in control portion 521 and ON SITE tab 513 selected in control portion 511, the folder for unit E4 (which is operating on the first floor of the library) is selected in display portion 516. The unit E4 includes four members (Chuck P, Dorel L, John L, and Thierry K), each of which is carrying a video camera. Thus, the selection of this combination of tabs/folders results in display of four video thumbnails $810_1$-$810_4$ (collectively, video thumbnails 810) in display portion 526. As depicted in FIG. 8, for each of the four emergency responders of unit E4, the name of the emergency responder is displayed next to the associated video thumbnail for that emergency responder.

In continuation of this example, each of the four videos displayed as video thumbnails in display portion 526 is individually selectable (e.g., by clicking either the video thumbnail icon or the name icon) such that, upon selection of one of the video streams, a high resolution version of the selected video stream is displayed in display portion 526. For example, a larger version of the video stream may be displayed. As depicted in FIG. 8, the video thumbnail associated with John L has been selected and, thus, the low resolution video thumbnail initially displayed in display portion 526 is also being displayed as a high resolution video stream in display portion 526 (denoted as video 820).

Although primarily depicted and described with respect to two video quality levels (i.e., low resolution and high resolution), any number of video quality levels may be supported. Although primarily depicted and described with respect to video thumbnails and video windows, video streams may be presented in various other ways. Although primarily depicted and described with respect to four video thumbnails and one video window, any number of low resolution and high resolution video streams may be displayed, and in any manner. Thus, the video display capabilities are not intended to be limited to the examples depicted and described herein.

The video streams displayed in display portion 526 are received from video cameras associated with emergency responders at the emergency site and/or video cameras deployed at the emergency site independent of any specific emergency responder. The video streams may be received in any manner.

In one embodiment, for example, upon a selection that constitutes a request to display one or more video streams (e.g., the commander switches from the TRACKING tab 523 to the VIDEO tab 522), PECB 410 may provide a control signal to each video camera for which there is a request to display a video stream. In this embodiment, a control signal provided from PECB 410 to a video camera instructs the video camera to begin streaming video to PECB 410. The control signal may also instruct the video camera as to the level of quality with which the video stream is to be provided (e.g., as a low quality stream for display as a thumbnail, as a high quality stream for display as a full video, and the like).

Similarly, in one embodiment, for example, upon a selection that is indicative that a video stream that is currently being displayed no longer needs to be displayed (e.g., the commander switches from the VIDEO tab 522 to the TRACKING tab 523), PECB 410 may provide a control signal to each video camera for which there is an indication that the video stream no longer needs to be displayed. In this embodiment, a control signal provided from PECB 410 to a video camera instructs the video camera to stop streaming video to PECB 410.

Similarly, in one embodiment, for example, upon a selection that is indicative that a video stream that is currently being displayed with one level of quality should be displayed with another level of quality (e.g., the commander clicks one of the video thumbnails displayed in display portion 526 in order to display the full version of that video stream in display portion 526), PECB 410 may provide a control signal to the video camera that is providing that video stream. The control signal instructs the video camera to change the level of quality with which the video stream is being provided (e.g., from low quality to high quality, from high quality to low quality, and the like).

The control signaling between PECB 410 and video cameras available at emergency site 101 may be implemented in any manner. In one embodiment, for example, control signaling between PECB 410 and video cameras available at emergency site 101 may be implemented as depicted and described in U.S. patent application Ser. No. 11/862,321, entitled "METHOD AND APPARATUS FOR CONTROLLING VIDEO STREAMS", which is hereby incorporated by reference in its entirety. The control signaling between PECB 410 and video cameras for facilitating display of video streams in the display portion 526 when VIDEO tab 522 is selected may be implemented in various other ways.

Figure 9:
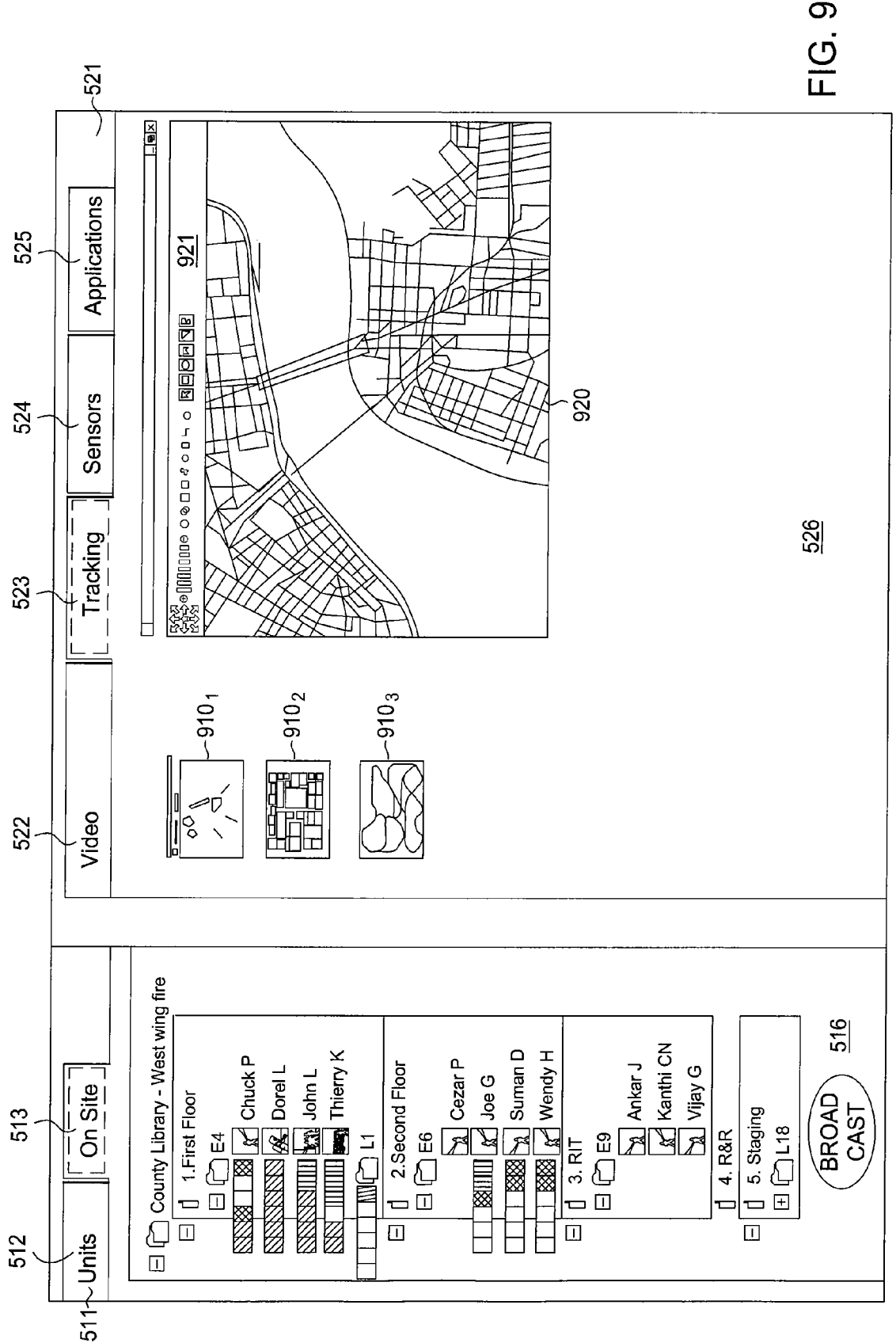
FIG. 9 depicts the user interface of FIG. 5 with the ON SITE and TRACKING tabs selected.

FIG. 9 depicts the user interface of FIG. 5 with the ON SITE and TRACKING tabs selected. As depicted in FIG. 9, selection of ON SITE tab 513 (or UNITS tab 512) in control portion 511 and TRACKING tab 523 in control portion 521 results in the display of tracking graphics in display portion 526. The tracking graphics may include any graphics which may be useful in tracking locations (and movements) of emergency response units (and individual emergency responders) at an emergency site. For example, tracking graphics may include maps (e.g., geographical maps, topological maps, and the like), satellite images, building plans, floor plans, and the like, as well as various combinations thereof. The tracking graphics may include any other graphics which may be used for tracking emergency units and emergency personnel at an emergency site.

The tracking graphics may be displayed in display portion 526 in any manner. In one embodiment, each of the available tracking graphics may be initially displayed as an icon. In one such embodiment, each of the tracking graphics is displayed as a small icon, thereby leaving room in display portion 526 for larger versions of the icons to be displayed as needed. In one embodiment, the size of the icons for the tracking graphics may be adapted in accordance with the number of tracking graphic icons available for the display, the size of display portion 526, and like factors. In one embodiment, each of the icons may be individually selectable, where selection of one of the tracking graphics icons causes a larger version of that tracking graphic to be displayed in display portion 526 (in addition to the tracking graphic icons, in place of the tracking graphic icons, and the like).

In one embodiment, a selected tracking graphic (e.g., one selected such that a larger version of the tracking graphic is displayed as the primary tracking graphic in display portion 526) may have an associated toolbar which may be used to perform various functions. In one such embodiment, for example, the toolbar may support zoom in/out functions, scrolling functions, highlighter functions (e.g., for highlighting specific areas of the tracking graphic), editing functions (e.g., for making notes on the tracking graphic, for modifying the tracking graphic as needed, and the like), and the like, as well as various combinations thereof. In such embodiments, the toolbar may support any other functions which may be associated with such a graphic.

In one embodiment, location tracking information may be overlaid on one or more of the tracking graphics such that the emergency commander can track the movements of units, the movements of individual emergency responders, and the like, as well as various combinations thereof. In one embodiment, the overlay of location tracking information may be performed manually. In another embodiment, the overlay of location tracking information may be performed automatically (e.g., using location tracking technology). For example, the location tracking information that is overlaid on tracking graphics may be obtained using GPS tracking information (e.g., where the emergency responders each have an associated GPS receiver) or any other location tracking technology.

As an example, as depicted in FIG. 9, selection of ON SITE tab 513 in control portion 511 and TRACKING tab 523 in control portion 521 results in the display of tracking graphics in display portion 526. The tracking graphics include a plurality of tracking graphic icons $910_1$-$910_3$ associated with the emergency site (i.e., the County Library), each of which is adapted for being selected to display a larger version of that tracking graphic. Specifically, the tracking graphics icons $910_1$-$910_3$ include a map of the area in which the County Library is located, a map of the floor plan of the County Library, and a topographical map of area in which the library is located. As depicted in FIG. 9, tracking graphic $910_1$ has been selected, thereby resulting in display of a larger version of that tracking graphic (denoted as 920).

FIG. 10 depicts the user interface of FIG. 5 with the ON SITE and SENSORS tabs selected. As depicted in FIG. 10, with ON SITE tab 513 (or UNITS tab 512) selected in control portion 511 and SENSORS tab 524 selected in control portion 521, selection of a portion of the accountability hierarchy in display portion 516 results in display of associated monitoring status information in display portion 526. The monitoring status information includes status information from monitoring devices (e.g., any of the sensors, detectors, or other monitoring devices) associated with emergency personnel that are carrying such monitoring devices or have such monitoring devices in their emergency equipment.

As an example, as depicted in FIG. 10, with ON SITE tab 513 selected in control portion 511 and SENSORS tab 524 selected in control portion 521, the County Library folder has been selected in display portion 516. Since the County Library folder includes subfolders associated with each of the different units deployed at the County Library, selection of this combination results in the display (in display portion 526) of monitoring status information at the unit level. Specifically, a monitoring status table 1010 is displayed in the display portion 526. The monitoring status table 1010 displays monitoring status information for each of the units deployed.

As displayed in FIG. 10, monitoring status table 1010 includes rows for each of the units for which monitoring status is presented (in this example, for units E4, L1, E6, E9, and L18 which are deployed at the County Library fire) and columns for each of the different types of monitoring devices which may be carried by the emergency responders of the units for which the monitoring status information is presented (in this example, for a self-contained breathing apparatus (SCBA), a personal alert safety system (PASS), a gas detector (GAS), an outside temperature sensor (TEMP), and a heart rate monitor (HEART)).

The monitoring status for a particular unit and a particular monitoring category may be determined from a status indicator at the intersection of the associated row and column of monitoring status table 1010. The status for each of the monitoring categories may be indicated in many ways. In one embodiment, color coding may be used to indicate status (e.g., shading cells of monitoring status table 1010 using different colors to indicate different types of status). For example, green, orange, and red may be used to indicate different status levels (e.g., normal conditions, moderately unsafe conditions, and dangerous conditions, respectively). In one such embodiment, if there is no status available for a particular unit and a particular category, monitoring status is not provided (e.g., the associated cell of the monitoring status table 1010 may be left white, grayed out, and the like).

As depicted in FIG. 10, in monitoring status table 1010, SCBA status is displayed for each of units E4, L1, E6, and E9, PASS status is displayed for each of units E4, L1, E6, and E9, GAS status is displayed for each of units E4 and L1, TEMP status is displayed for each of units E4, L1, E6, and E9, and HEART status is displayed for each of units E4, L1, E6, and E9. There is no GAS status displayed for units E6 and E9 because the gas detectors carried by the emergency responders of those units are not active or none of the emergency responders of either of those units is carrying a gas detector. Similarly, there is no status (in any of the five monitoring categories) for unit L18 because the gas detectors carried by the emergency responders of those units are not active or none of the emergency responders of that unit are carrying any of the different monitoring devices for which status is displayed.

As depicted in FIG. 10, for unit E4, the SCBA status for the unit as a whole is green, the PASS status for the unit as a whole is green, the GAS status for the unit as a whole is orange, and the TEMP and HEART statuses for the unit as a whole are both red. Similarly, for unit L1, the SCBA, PASS, GAS, and HEART statuses for the unit as a whole are all green, however, the TEMP status for the unit as a whole is orange. Similar status indicators are displayed in monitoring status table 1010 for some of the different monitoring categories for some of the other units deployed to the County Library for the fire. This is similar to the status information that is displayed in display portion 516 when the ON SITE tab 513 is selected from control portion 511 (however, display of monitoring status in display portion 516 may enable the emergency commander to obtain some additional monitoring status information.

In one embodiment, for example, each cell of monitoring status table 1010 may be individually selectable to obtain additional information about the selected cell. For example, selection of the cell associated with GAS status for unit E4 may result in display of respective GAS statuses for each of the members of the unit E4. For example, selection of the cell associated with SCBA status for unit E6 may result in display of respective SCBA statuses for each of the members of unit E6. The other cells of the monitoring status table 1010 (including row header cells and column header cells) may be selected to display the associated monitoring status information.

FIG. 10 depicts monitoring status information displayed at the unit level. In one embodiment, monitoring status information may be displayed at the emergency personnel level. In one embodiment, personnel-level status monitoring information may be displayed in display portion 526 by selecting one of the unit folders from the organizational hierarchy displayed in display portion 516. In one embodiment, the different units displayed in monitoring status table 1010 may be selectable (e.g., double clicking the row, highlighting the row and initiating some other action, and the like), causing personnel-level monitoring status information for each of the individual emergency responders of the selected unit to be displayed (e.g., broken out into monitoring status for each emergency responder associated with the selected unit). An example is depicted and described with respect to FIG. 11.

FIG. 11 depicts the user interface of FIG. 5 with the ON SITE and SENSORS tabs selected. As depicted in FIG. 10, with ON SITE tab 513 (or UNITS tab 512) selected in control portion 511 and SENSORS tab 524 selected in control portion 521, selection of a portion of the accountability hierarchy in display portion 516 results in display of associated monitoring status information in display portion 526. As in the example of FIG. 10, the monitoring status information includes status information from monitoring devices (e.g., any of the sensors, detectors, or other monitoring devices) associated with emergency personnel that are carrying such monitoring devices or have such monitoring devices in their emergency equipment.

As an example, as depicted in FIG. 11, with ON SITE tab 513 selected in control portion 511 and SENSORS tab 524 selected in control portion 521, the E4 unit folder has been selected in display portion 516 (or, alternatively, the E4 unit row of the monitoring status table 1010 has been selected from display portion 526). Since the E4 unit includes four emergency personnel (Chuck P, Dorel L, John L, and Thierry K) selection of this combination results in the display (in display portion 526) of monitoring status information for each of these emergency personnel at the individual level. As depicted in FIG. 11, a monitoring status table 1110 is displayed in the display portion 526.

The monitoring status table 1110 of FIG. 11 is similar to the monitoring status table 1010 of FIG. 10. As displayed in FIG. 11, monitoring status table 1110 includes rows for each emergency responder of unit E4 and columns for each of the different types of monitoring devices which may be carried by the emergency responders of unit E4 (illustratively, SCBA, PASS, GAS, TEMP, and HEART). As described with respect to monitoring status table 1010 of FIG. 10, the monitoring status for a particular emergency responder and a particular monitoring category may be determined from a status indicator at the intersection of the associated row and column of monitoring status table 1110, and the status for each of the monitoring categories may be indicated in many ways (e.g., color coding, shading, and the like).

As depicted in FIG. 11, different emergency responders may carry different combinations of monitoring devices (e.g., Chuck P, Dorel L, John L, and Thierry K are each carrying SCBA and PASS devices; Chuck P, Dorel L, and John L, are each carrying GAS devices; and Dorel L, John L, and Thierry K are each carrying TEMP and HEART devices). There is no TEMP status or HEART status displayed in monitoring status table 1110 for Chuck P because he is not carrying a temperature sensor or a heart rate monitor and there is no GAS status displayed in monitoring status table 1110 for Thierry K because he is not carrying a gas detector.

As depicted in FIG. 11, the emergency commander can determine the monitoring status for each of the members of unit E4. For Chuck P, the SCBA status and PASS status are both green and the GAS status is orange. For Dorel L, the SCBA, PASS, GAS, TEMP, and HEART statuses are all green. For John L, the SCBA, PASS, GAS, and TEMP statues are green, and the HEART status is red. For Thierry K, the SCBA and PASS statuses are green, and the TEMP and HEART statuses are both red. This is similar to the status information that is displayed in display portion 516 when the ON SITE tab 513 is selected from control portion 511, however, display of the monitoring status in display portion 516 may enable the emergency commander to obtain some additional monitoring status information.

In one embodiment, for example, each cell of monitoring status table 1110 may be individually selectable to obtain additional information about the selected cell. For example, selection of an individual cell may result in display of information such as the type of monitoring device, the connection time of the monitoring device, the current (or most recent) value read by monitoring device, historical information about values read by the monitoring device (e.g., graphs or other graphics indicative of evolution of the values of the monitoring device over time), configuration information associated with the monitoring device (e.g., current threshold values that are set for the monitoring device), and the like, as well as various combinations thereof.

For example, selection of the cell of monitoring status table 1110 that is associated with GAS status for Chuck P may result in display of information for the gas detector that is being carried by Chuck P, such as the type of gas detector being used, information about the connection of the gas detector to the network, the current gas readings from the gas detector, threshold values currently being used by the gas detector for determining the monitoring status, historical gas readings from the gas detector, and the like, as well as various combinations thereof. Similarly, for example, selection of any of the other cells of monitoring status table 1110 (including row and column headers) result in display of similar types of information (and possibly other information).

As depicted and described herein with respect to FIG. 10 and FIG. 11, monitoring status information may be presented in many ways (e.g., using tables, color coding, and the like, as well as various combinations thereof). Furthermore, the appropriate status levels that are ultimately presented via SENSORS tab 524 (and, optionally, via display portion 516, depending on the type of status information displayed in accountability window 510 when ON SITE tab 513 is selected) may be determined in many ways (which may vary depending on a number of factors, such as the level at which the monitoring status information is needed, the monitoring categories for which monitoring status may be needed, and the like).

In one embodiment, at the unit level, the monitoring status level may be determined using a combination of the corresponding status levels for each of the emergency responders that belong to that unit. In one such embodiment, the monitoring status level may be combined within monitoring categories. For example, as depicted in FIG. 10, SCBA status for unit E4 is green, and this is determined using the SCBA status levels for each of the members of unit E4 (namely, Chuck P, Dorel L, John L, and Thierry K). Similarly, PASS status for unit E6 is red, and this is determined using the PASS status levels for each of the members of unit E6. Similarly, for example, there is no status for any of the monitoring categories for unit L18 (e.g., none of the emergency personnel of unit L18 are carrying any monitoring devices, the devices carried by emergency personnel of unit L18 are not currently active, and the like).

The rules for determining a monitoring status level for a group (e.g., unit, battalion, and the like) using the corresponding monitoring status levels associated with the emergency personnel of the group may be implemented in many ways. In one embodiment, for example, using green, orange, and red status levels described above (for one particular monitoring category): (1) if the monitoring status is green for all emergency responders in the unit, the monitoring status that is displayed for that monitoring category at the unit level is green; (2) if the monitoring status is orange for one or more emergency responders in the unit (but none of the monitoring statuses is red), the monitoring status that is displayed for that monitoring category at the unit level is orange; and (3) if the monitoring status is red for one or more emergency responders in the unit, the monitoring status level that is displayed for that monitoring category at the unit level is red. The rules may be implemented in various other ways.

In one embodiment, at the responder level, the appropriate monitoring status levels may be detected using thresholds associated with the different monitoring devices. In one embodiment, for example, when a first threshold is crossed the monitoring status for that monitoring category changes from a first status level (e.g., green) to a second status level (e.g., orange) and when a second threshold is crossed the monitoring status for the monitoring category changes from the second status level (e.g., orange) to a third status level (e.g., red). For example, for a heart rate monitor, the first threshold may be a heart rate of 100 beats per minute and the second threshold may be a heart rate of 120 beats per minute.

The thresholds used for controlling status levels may be set in any manner. The thresholds may be preconfigured and/or dynamically configured as needed. The thresholds may be set at any hierarchical level (e.g., at any level of the organizational hierarchy). For example, thresholds may be set for each individual monitoring device such that the thresholds are different for different emergency responders (e.g., based on their abilities or other similar factors), thresholds may be set at the monitoring category level such that the thresholds are the same for all emergency responders that are using that type of monitoring device, and the like, as well as various combinations thereof. The thresholds may be set/modified in any other manner (which may vary based on different factors, such as the type of monitoring device, preferences of the emergency commander, and the like).

Although primarily depicted and described with respect to specific types and numbers of monitoring devices (and, thus, monitoring categories), status levels, status indicators (e.g., specific numbers of colors and specific colors used, mappings of colors to associated status levels, and the like), status thresholds, and the like, monitoring status detection and presentation may be implemented using other types and/or numbers of monitoring devices, status levels, status indicators, status thresholds, and the like, as well as various combinations thereof. The monitoring status capabilities of PECB 410 are not intended to be limited by any of the examples depicted and described herein.

The status information displayed in display portion 516 and/or display portion 526 is received from monitoring devices associated with emergency responders at the emergency site. The monitoring status information may be received in any manner, which may vary depending on the type of monitoring device from which the status information is being received.

In one embodiment, PECB 410 may receive raw monitoring status information and process the raw monitoring status information in order to generate monitoring status information displayed in display portion 516 and/or display portion 526. In one embodiment, PECB 410 may receive processed monitoring status information and convert the processed monitoring status information for displayed in display portion 516 and/or display portion 526. The receiving/processing/conversion of information received from monitoring devices may be performed in any manner.

In one embodiment, PECB 410 receives monitoring status information from monitoring devices irrespective of whether or not SENSORS tab 524 is selected (e.g., where monitoring status information is displayed in display portion 516 while ON SITE tab 513 is selected).

In one embodiment, in which monitoring status information is not displayed in display portion 516 when the SENSORS tab 524 is not selected, selection of the SENSORS tab 524 may trigger propagation of control signals from PECB 410 to each associated monitoring device (e.g., each monitoring device of each emergency responder at the emergency site such as in FIG. 10, each monitoring device of each emergency responder of a unit where a unit is selected such as in FIG. 11, and the like) to instruct the monitoring devices to start providing monitoring status information. In this embodiment, subsequent deselection of the SENSORS tab triggers propagation of control signals from PECB 410 to each associated monitoring device to instruct the monitoring devices to stop providing monitoring status information.

The control signaling between PECB 410 and monitoring devices at emergency site 101 may be implemented in any manner. In one embodiment, for example, control signaling between PECB 410 and video cameras available at emergency site 101 may be implemented as depicted and described in U.S. patent application Ser. No. 11/862,321, entitled "METHOD AND APPARATUS FOR CONTROLLING VIDEO STREAMS", which is hereby incorporated by reference in its entirety. The control signaling between PECB 410 and monitoring devices for facilitating display of monitoring status information in display portion 516 and/or display portion may be implemented in various other ways.

Figure 12:
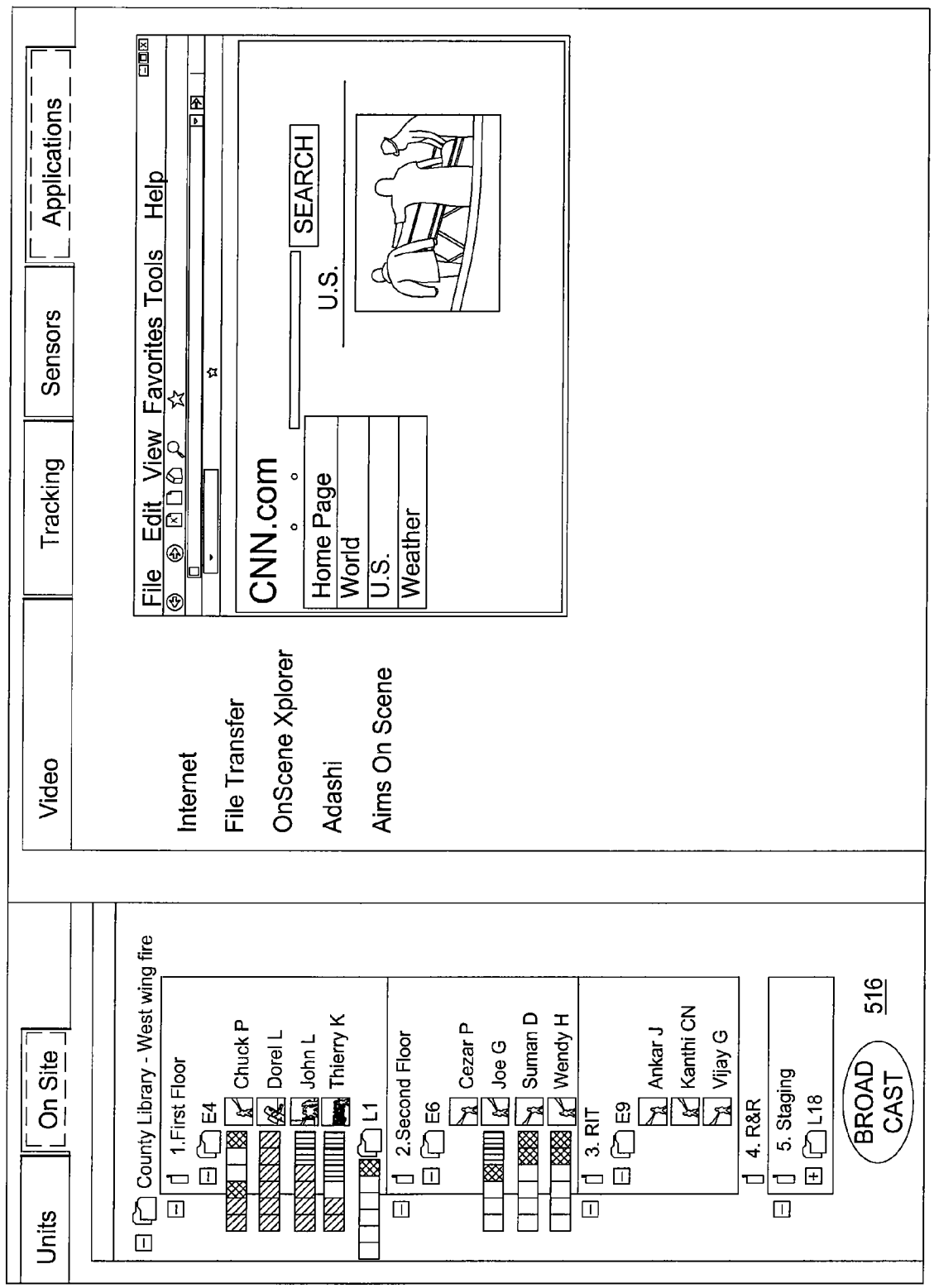
FIG. 12 depicts the user interface of FIG. 5 with the ON SITE and APPLICATIONS tabs selected.

FIG. 12 depicts the user interface of FIG. 5 with the ON SITE and APPLICATIONS tabs selected. As depicted in FIG. 12, selection of ON SITE tab 513 (or UNITS tab 512) in control portion 511 and APPLICATIONS tab 525 in control portion 521 results in the display of a list of applications which may be accessed and used by the emergency commander. The applications available from PECB 410 may include any applications which may be useful to emergency commanders at an emergency site. For example, applications available from PECB may include Internet browsers, file transfer applications, instant messaging applications, emergency site management applications (e.g., ON-SCENE EXPLORER, ADASHI, AIMS ON SCENE, other similar applications), and the like, as well as various combinations thereof.

In one embodiment, as depicted in FIG. 12, with ON SITE tab 513 (or UNITS tab 512) selected in control portion 511, selection of APPLICATIONS tab 525 from the control portion 521 results in the display of a list of available applications in the display portion 526. The available applications may be displayed in any manner (e.g., as links, as icons, and the like). The available applications are individually selectable from display portion 526. The available applications may be selected in any manner. The selection of an available application causes the application to be launched (e.g., in display portion 526, in a separate window, and the like).

In the example of FIG. 12, five applications are displayed and available for selection from the display portion 526: Internet, File Transfer, ONSCENE XPLORER, ADASHI, and AIMS ON SCENE. The five available applications are displayed in display portion 526 as a list of links. As depicted in FIG. 12, selection of one of the applications causes the selected application to be launched. Specifically, in the example of FIG. 12, an Internet browsing application has been selected, causing the Internet browsing application to be launched and the associated Internet browser window to be displayed in the display portion 526.

Although primarily depicted and described with respect to specific applications, various other applications may be made available via display portion 526 while APPLICATIONS tab 525 is selected. Although primarily depicted and described with respect to launching one application via display portion 526, multiple applications may be launched via display portion 526 while APPLICATIONS tab 525 is selected. The available applications may be displayed in other ways, selected in other ways, and launched in other ways, and the resulting application windows may be displayed in many ways. In other words, any number of applications may be accessed and utilized by the emergency commander via APPLICATIONS tab 525.

Although depicted and described herein with respect to specific numbers and configurations of windows, control portions, display portions, and the like, user interface 500 of PECB 410 may be implemented using various other numbers and configurations of windows, control portions, display portions, and the like. The user interface 500 of PECB 410 may be implemented in a manner for displaying less information, more information, and/or different information than depicted and described herein. The user interface 500 of PECB 410 may be implemented in a manner for presenting such information in different ways (e.g., presenting different combinations of information, different formatting of the information, and the like, as well as various combinations thereof). Thus, user interface 500 of PECB 410 may be implemented such that information depicted and described herein as being displayed and controlled in specific ways may be displayed and controlled in various other ways.

Although primarily depicted and described with respect to a specific types of information which may be presented and controlled via the user interface of PECB 410, various other types of information may be presented and controlled via the user interface of PECB 410. The types of information presented and controlled via the user interface of PECB 410 may be different for different types of situations in which PECB 410 is used.

For example, the types of information presented and controlled via the user interface of PECB 410 may be different for different types of emergency response organizations (e.g., the information required to manage emergency situations may be different for fire departments, police departments, hazmat units, the Department of Homeland Security (DHS), the Federal Emergency Management Agency (FEMA), and the like, as well as various combinations thereof).

For example, the types of information presented and controlled via the user interface of PECB 410 may be different for different types of events at which a 911-NOW network may be deployed and controlled via PECB 410 (e.g., the information required to manage emergency response events, large-crowd events, military applications, and the like, may be different for such different events).

In such embodiments, different accountability information may be presented and controlled, different types and numbers of video streams may be presented and controlled (e.g., via VIDEO tab 522 or one or more other tabs), different types of maps and information may be presented and controlled (e.g., via TRACKING tab 523 or one or more other tabs), status for different types of monitoring devices may be presented and controlled (e.g., via SENSORS tab 524 or one or more other tabs), different types of applications may be supported (e.g., via APPLICATIONS tab 525 or one or more other tabs). Furthermore, less or more information, as well as various other types and combinations of information, may be supported via the user interface of PECB 410.

Thus, the user interface depicted and described herein with respect to FIG. 6-FIG. 12 merely constitutes one exemplary implementation associated with the deployment of the New York Fire Department to a fire at a County Library. The PECB 410 is not intended to be limited by this example. The format of the user interface of PECB 410 is not intended to be limited by this example. Similarly, the types of information presented and controlled, the manner in which the information is presented and controlled, and the like, are not intended to be limited by this example.

Figure 13:
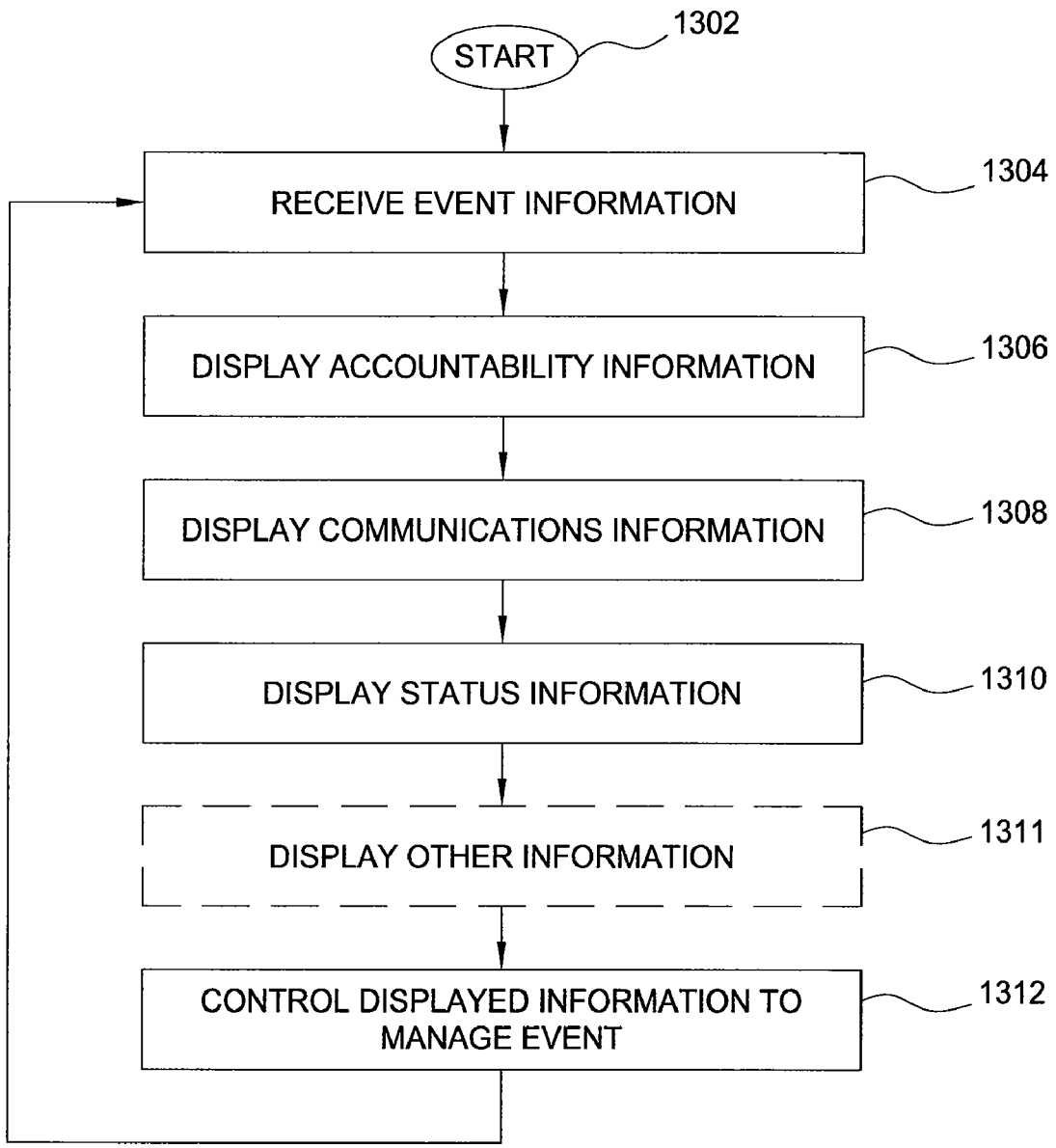
FIG. 13 depicts a method according to one embodiment.

FIG. 13 depicts a method according to one embodiment. Specifically, method 1300 includes a method for presenting information via a user interface of a portable electronic command board (PECB). Although primarily depicted and described herein as being performed serially, at least a portion of the steps of method 1300 may be performed contemporaneously, or in a different order than depicted and described with respect to FIG. 13. The method 1300 begins at step 1302 and proceeds to step 1304.

At step 1304, event information is received. The event information may include any information associated with the event (as depicted and described herein in FIG. 4-FIG. 12). The event information may be received from any source. For example, event information may be received via a user interface of the PECB, from different devices that are deployed at the event (e.g., cell phones, headsets, walkie-talkies, sensors, and the like), via the Internet, and the like, as well as various combinations thereof.

At step 1306, accountability information is displayed. At step 1308, communications information is displayed. At step 1310, monitoring status information is displayed. At step 1311 (an optional step, depending on which combination of tabs is selected on the PECB), other types of information may be displayed. The information may be displayed in any manner for displaying such information. The display of such information may be better understood by way of reference to FIG. 4-FIG. 12.

At step 1312, the displayed information may be controlled to manage the event. The information may be controlled in any manner, which depends on the design of the user interface as well as the manner in which information is displayed. For example, the information may be controlled using one or more of "drag and drop" operations, "point and click" operations, and the like, as well as any other way of manipulating the display of information.

For example, accountability information may be displayed a manner tending to enable rapid redeployment of at least one unit at the event. For example, the event commander may drag and drop different units between different folders corresponding to different functions to be performed at the event, thereby enabling the event commander to easily track accountability during the course of the event. This may also be used to track deployment locations during the course of the event (e.g., where the accountability at the event is organized according to different locations at the event).

For example, communications information may be displayed in a manner tending to enable modification of communications assignments at the event. For example, the event command may drag and drop units between calling groups to reassign units to different calling groups as needed. This enables the event commander to track which units belong to which calling groups. This also enables the event commander to initiate communications with individual calling groups, or even with all members of all units that are deployed to the event.

For example, communications information may be displayed in a manner tending to enable modification of communications capabilities at the event. For example, the event command may drag and drop units between calling groups to reassign units to different calling groups as needed, which may trigger automatic reconfiguration of the underlying communications network (e.g., by modifying calling groups configured on a voice conferencing server, by adding/deleting network connections as needed, and the like, as well as various combinations thereof).

For example, status information may be displayed in conjunction with the accountability information and the communication information in a manner that enables an event commander to the accountability of at least a portion of the unit, based on at least a portion of the displayed status information, using at least a portion of the displayed communication information. For example, where monitoring status information received from monitoring devices carried by members of a unit indicate fatigue of the members, the event commander may reassign the unit from a first location (fighting a fire) to a second location (a rest area) using a calling group (clicking the calling group to enable the event commander to speak to each of the members of the unit to tell them to head to the rest area).

Although specific examples have been described, it will be understood that the displayed information may be controlled to manage the event in many other ways. Additional examples are depicted and described with respect to FIG. 4-FIG. 12.

From step 1312, method 1300 returns to step 1304. In other words, event information continues to be received and displayed in a manner tending to enable control of the information for dynamically managing the event. Thus, the PECB provides a single command and control interface by which an event commander may manage operations at the event.

Figure 14:
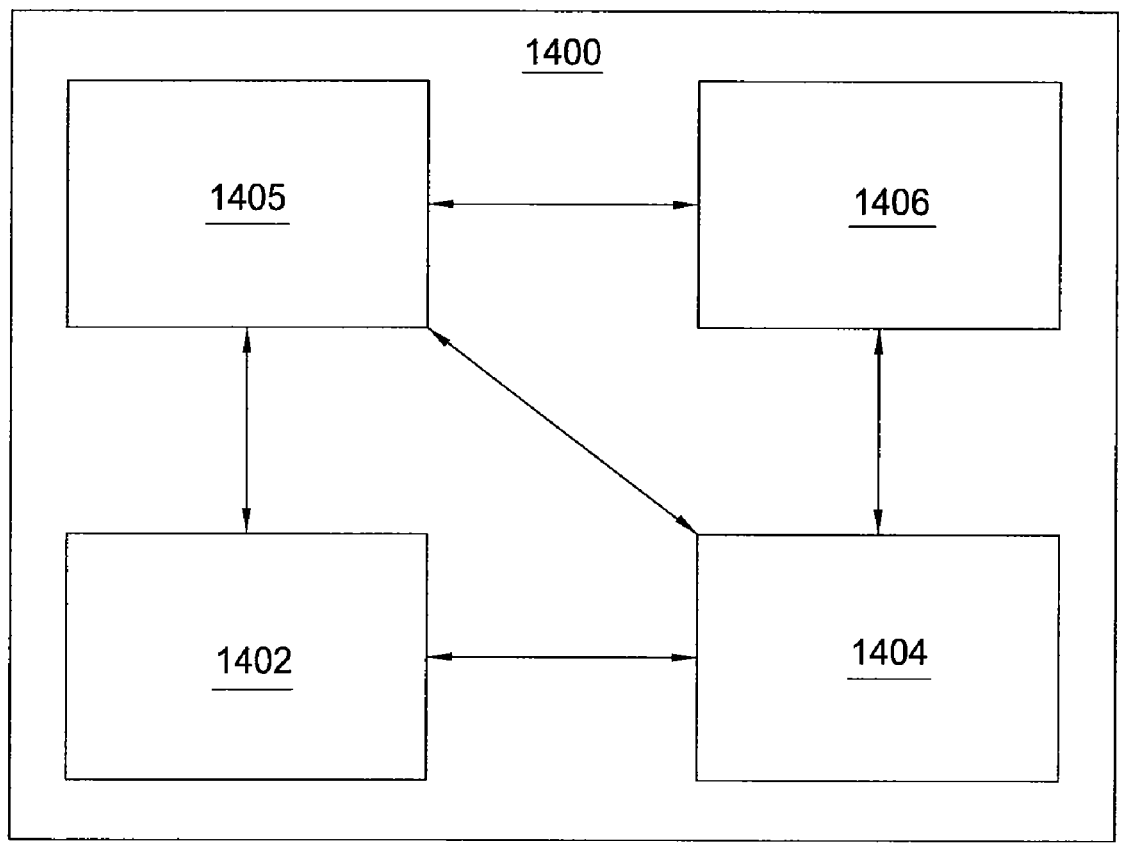
FIG. 14 depicts a high-level block diagram of a general-purpose computer suitable for use in performing the functions described herein.

FIG. 14 depicts a high-level block diagram of a general-purpose computer suitable for use in performing the functions described herein. As depicted in FIG. 14, system 1400 comprises a processor element 1402 (e.g., a CPU), a memory 1404, e.g., random access memory (RAM) and/or read only memory (ROM), a portable electronic control board module 1405, and various input/output devices 1406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that various functions and features described herein may be implemented using software and/or a combination of software and hardware, e.g., using application specific integrated circuits (ASIC), a general purpose computer or any other hardware equivalents. In one embodiment, the present portable electronic control board process 1405 can be loaded into memory 1404 and executed by processor 1402 to implement the functions as discussed above. As such, portable electronic control board process 1405 (including associated data structures) can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes as depicted and described herein are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes as depicted and described herein may be deployed to any geographical location to form a wireless network for any reason.

Although the PECB functions are primarily depicted and described herein within the context of using the PECB to manage a 911-NOW network deployed to provide communications for an emergency event, the PECB functions depicted and described herein may be used to manage 911-NOW networks deployed to provide communications for various other types of events. Although the PECB functions are primarily depicted and described herein within the context of using the PECB to manage a 911-NOW network, the PECB functions depicted and described herein may be used to manage various other types of networks.

It is contemplated that some of the steps discussed herein as software methods may be implemented within hardware, for example, as circuitry that cooperates with the processor to perform various method steps. Portions of the functions and features described herein may be implemented as a computer program product wherein computer instructions, when processed by a computer, adapt the operation of the computer such that the methods and/or techniques are invoked or otherwise provided. Instructions for invoking the methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A mobile communication apparatus for displaying and controlling information for managing an event, comprising:
   a processor configured to:
      control display of accountability information associated with a unit deployed to the event, wherein the accountability information is indicative of accountability of the unit with respect to at least one function to be performed for the event, the accountability information associated with the unit comprises location information indicative of a location at which the unit is currently operating;
      control display of status information associated with the unit deployed to the event; and
      control display of communication information for the unit deployed to the event, wherein the communication information has an underlying calling group configured therefor, wherein the calling group is configured in a manner enabling communication between members of the unit, wherein at least a portion of the communication information is configured for enabling communication between members of the unit and one or more users using the calling group, wherein at least a portion of the communication information is configured for use in reconfiguring the calling group; and
      control display of communication information in a manner for facilitating reassignment of units between at least a first and second calling groups and modifying a level within an organizational structure of personnel communicating with said units based on said accountability information.

2. The mobile communication apparatus of claim 1, wherein the communication information comprises a communication initiation mechanism configured for use in initiating communication with members of the unit.

3. The mobile communication apparatus of claim 1, wherein the calling group is adapted for being configured using at least a portion of the information for which display is controlled.

4. The mobile communication apparatus of claim 1, wherein the calling group is adapted for being configured by at least one of:

selecting an icon associated with the unit; and
dragging and dropping an icon associated with a member of the unit.

5. The mobile communication apparatus of claim 1, wherein the calling group is configured in a manner enabling communication between members of the unit without the members of the unit performing any action to initiate such communications.

6. The mobile communication apparatus of claim 1, wherein the communication information comprises a broadcast communications initiation mechanism, wherein the broadcast communications initiation mechanism is selectable for enabling communication with all members of all units deployed to the event.

7. The mobile communication apparatus of claim 1, wherein the status information comprises at least one of at least one video stream, location tracking information, and monitoring status information.

8. The mobile communication apparatus of claim 1, wherein the processor is configured to:
receive the status information from at least one device associated with the unit deployed to the event.

9. The mobile communication apparatus of claim 8, wherein the status information comprises at least one video stream, wherein the at least one video stream is received from at least one video camera.

10. The mobile communication apparatus of claim 8, wherein the status information comprises monitoring status information, wherein the monitoring status information is received from at least one monitoring device.

11. The mobile communication apparatus of claim 1, wherein the processor is configured to:
control display of at least one location tracking graphic for the event.

12. The mobile communication apparatus of claim 1, wherein the processor is configured to:
control display of the accountability information in a manner for facilitating redeployment of the unit at the event.

13. The mobile communication apparatus of claim 1, wherein the calling group is a first calling group, wherein the processor is configured to:
control display of the communication information in a manner for facilitating reassignment of the unit from the first calling group to a second calling group.

14. The mobile communication apparatus of claim 13, wherein reassignment of the unit from the first calling group to the second calling group initiates a reconfiguration of at least one network communication channel.

15. The mobile communication apparatus of claim 13, wherein each calling group is selectable for initiating communications with each of a plurality of persons associated with the unit.

16. The mobile communication apparatus of claim 1, wherein the processor is configured to:
control display of the accountability information, the status information, and the communication information in conjunction with each other to enable thereby a change to the accountability of at least a portion of the unit, based on at least a portion of the status information, using at least a portion of the communication information.

17. A method for displaying and controlling information for managing an event, comprising:
using a processor for:
controlling display of accountability information associated with a unit deployed to the event, wherein the accountability information is indicative of accountability of the unit with respect to at least one function to be performed for the event, the accountability information associated with the unit comprises location information indicative of a location at which the unit is currently operating;
controlling display of status information associated with the unit deployed to the event; and
controlling display of communication information for the unit deployed to the event, wherein the communication information has an underlying calling group configured therefor, wherein the calling group is configured in a manner enabling communication between members of the unit, wherein at least a portion of the communication information is configured for enabling communication between members of the unit and one or more users using the calling group, wherein at least a portion of the communication information is configured for use in reconfiguring the calling group; and
controlling display of communication information in a manner for facilitating reassignment of units between at least a first and second calling groups and modifying a level within an organizational structure of personnel communicating with said units based on said accountability information.

18. A non-transitory computer-readable storage medium storing instructions, which, when executed by a computer, cause the computer to perform a method for displaying and controlling information for managing an event, the method comprising the steps of:
controlling display of accountability information associated with a unit deployed to the event, wherein the accountability information is indicative of accountability of the unit with respect to at least one function to be performed for the event , the accountability information associated with the unit comprises location information indicative of a location at which the unit is currently operating;
controlling display of status information associated with the unit deployed to the event; and
controlling display of communication information for the unit deployed to the event, wherein the communication information has an underlying calling group configured therefor, wherein the calling group is configured in a manner enabling communication between members of the unit, wherein at least a portion of the communication information is configured for enabling communication between members of the unit and one or more users using the calling group, wherein at least a portion of the communication information is configured for use in reconfiguring the calling group; and
controlling display of communication information in a manner for facilitating reassignment of units between at least a first and second calling groups and modifying a level within an organizational structure of personnel communicating with said units based on said accountability information.

* * * * *